US008990856B2

(12) United States Patent
Zott et al.

(10) Patent No.: US 8,990,856 B2
(45) Date of Patent: Mar. 24, 2015

(54) MEDIA PLAYLIST MANAGEMENT AND VIEWING REMOTE CONTROL

(76) Inventors: Joseph A. Zott, Menlo Park, CA (US); Samuel W. Beal, Mountain View, CA (US); Robert Osann, Jr., Morgan Hill, CA (US)

( * ) Notice: Subject to any disclaimer, the term of this patent is extended or adjusted under 35 U.S.C. 154(b) by 231 days.

(21) Appl. No.: 13/481,430

(22) Filed: May 25, 2012

(65) Prior Publication Data

US 2012/0233639 A1 Sep. 13, 2012

Related U.S. Application Data

(63) Continuation of application No. 12/291,968, filed on Nov. 14, 2008, now abandoned.

(60) Provisional application No. 61/003,363, filed on Nov. 16, 2007, provisional application No. 60/901,671, filed on Feb. 13, 2007.

(51) Int. Cl.
| *H04N 21/482* | (2011.01) |
|---|---|
| *H04N 7/173* | (2011.01) |
| *H04N 21/41* | (2011.01) |
| *H04N 21/422* | (2011.01) |
| *H04N 21/845* | (2011.01) |
| *H04N 5/44* | (2011.01) |
| *H04N 21/431* | (2011.01) |
| *H04N 21/443* | (2011.01) |
| *H04N 21/462* | (2011.01) |

(52) U.S. Cl.
CPC ....... *H04N 7/17318* (2013.01); *H04N 21/4113* (2013.01); *H04N 21/42204* (2013.01); *H04N 21/4825* (2013.01); *H04N 21/4828* (2013.01); *H04N 21/8455* (2013.01); *H04N 5/4403* (2013.01); *H04N 21/4316* (2013.01); *H04N 21/4438* (2013.01); *H04N 21/4622* (2013.01)
USPC .................................. 725/40; 725/39; 725/42

(58) Field of Classification Search
CPC ................... H04N 21/42204; H04N 21/4316; H04N 21/4438; H04N 21/4622; H04N 21/4825; H04N 5/4403
See application file for complete search history.

(56) References Cited

U.S. PATENT DOCUMENTS

| 5,877,765 A | 3/1999 | Dickman et al. |
|---|---|---|
| 6,883,000 B1 | 4/2005 | Gropper |
| 7,996,863 B2 | 8/2011 | Wiltheiler |
| 2002/0049974 A1 | 4/2002 | Shnier |
| 2002/0152228 A1 | 10/2002 | Lopez et al. |
| 2002/0170067 A1 | 11/2002 | Norstrom et al. |
| 2003/0110499 A1* | 6/2003 | Knudson et al. ................ 725/42 |
| 2005/0120221 A1 | 6/2005 | Arnold et al. |
| 2005/0138033 A1 | 6/2005 | Katta et al. |
| 2006/0159109 A1* | 7/2006 | Lamkin et al. ................ 370/401 |

(Continued)

*Primary Examiner* — Rong Le

(57) ABSTRACT

According to this invention, a user may capture a media link on any PC and perform this capture function at any physical location, then save the media link in a playlist, and subsequently play the media located at the media link on a TV server. The TV server may be controlled from a local device—typically a PC or a handheld remote control. Playlists may be maintained on a Web playlist function. Software on a local controller device can then select a media link from a Web playlist through the Internet, and the Web playlist function can then pass that link to a local TV server, thus avoiding the need for the controller device and the TV server to communicate through a LAN. Additionally, a playlist may include targeted advertisements shown physically adjacent to related playlist items.

20 Claims, 26 Drawing Sheets

(56) References Cited

U.S. PATENT DOCUMENTS

| | | |
|---|---|---|
| 2007/0162939 A1* | 7/2007 | Bennett et al. .................. 725/74 |
| 2007/0162945 A1 | 7/2007 | Mills |
| 2008/0127266 A1* | 5/2008 | Ward et al. ...................... 725/42 |
| 2009/0006963 A1* | 1/2009 | Gonze et al. ................... 715/717 |
| 2009/0024927 A1* | 1/2009 | Schrock et al. ................ 715/722 |
| 2009/0158382 A1* | 6/2009 | Shaffer et al. ................. 725/131 |
| 2009/0228936 A1 | 9/2009 | Davis et al. |
| 2011/0219413 A1 | 9/2011 | Krikorian et al. |

* cited by examiner

Playlist User Interface Representation

| Order | Sel | Image | Media | URL |
|---|---|---|---|---|
| 1 | ☐ | ▼ | Web Video Title 1 | http://www.webaddress1.com |
| 2 | ☒ | ▼ | Web Video Title 2 | http://www.webaddress2.com |
| 3 | ☐ | ▼ | Web Video Title 3 | http://www.webaddress3.com |
| 4 | ☐ | ▼ | Web Video Title 4 | http://www.webaddress4.com |
| 5 | ☐ | ▼ | Web Video Title 5 | http://www.webaddress5.com |

MEDIA PLAYLIST MANAGEMENT AND VIEWING REMOTE CONTROL

CLAIM OF PRIORITY

This application is a continuation of U.S. patent application Ser. No. 12/291,968, filed on Nov. 14, 2008, entitled "MEDIA PLAYLIST MANAGEMENT AND VIEWING REMOTE CONTROL," by inventors Joseph A. Zott, Samuel W. Beal, and Robert Osann, Jr., and also claims the benefit and priority of: U.S. Provisional Application Ser. No. 61/003,363, filed on Nov. 16, 2007, entitled "MEDIA PLAYLIST MANAGEMENT AND VIEWING REMOTE CONTROL," by inventors Joseph A. Zott, Samuel W. Beal, and Robert Osann, Jr.; and U.S. Provisional Application Ser. No. 60/901,671, filed on Feb. 13, 2007, entitled "REMOTE CONTROL FOR VIDEO MEDIA SERVERS," by inventors Robert Osann, Jr. and Samuel W. Beal; and U.S. patent application Ser. No. 13/371,419, filed on Feb. 11, 2012, entitled "REMOTE CONTROL FOR VIDEO MEDIA SERVERS," by Robert Osann, Jr., Joseph A. Zott, and Samuel W. Beal, all of said applications commonly assigned with the present application and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to TV server computers used by consumers in their home for viewing videos and other media that are either streamed from the Web or previously stored, and the creation, storage, manipulation and access of media playlists used in conjunction with TV server computers, and in particular, methods for remote controlling TV server computers according to media links contained in playlists.

BACKGROUND

Currently, Web media is played almost exclusively on computers and not on TVs. It is known to connect a computer to a TV set in order to watch Web media, however it is difficult to control such a system within the typical scenario for TV watching where the viewer is sitting on a couch or chair some distance from the TV. While a wireless keyboard and mouse can enable the user to control the TV from a distance, it can be very difficult to view a Web browser display on a TV. This scenario also causes the viewer to surf the Web on their family's primary TV, disrupting the family's normal TV program viewing. This issue of disrupting the family's normal TV program viewing was the primary cause of the failure of the "Web TV" product offered by Microsoft in the 1990s.

A solution to these problems was previously put forth in Provisional Application No. 60/901,671, entitled "Remote Control for Video Media Servers" with common inventors and commonly assigned with the present invention. For the purpose of this application, "media server" and "TV server" are synonymous—representing a computer whose video output is connected to a conventional TV set or video display used for viewing TV programming. The invention described in Application No. 60/901,671 enabled a TV server to be remotely controlled from another computer allowing any Web media content to be viewed on the TV, while controlling the TV server easily and from a comfortable distance. It also allowed Web media capture to be performed on the TV server without disturbing family TV viewing. This application did not, however, address the issue of capturing Web media links and consolidating those links into a "playlist" for viewing at a later time, including different methods for using those media links to remotely control a TV server.

Today, Web media is typically located by consumers on a PC using a Web browser and some form of search engine capability. Using a search engine requires typing strings of alphanumeric characters and thus a full keyboard or full keyboard functionality is normally required to successfully locate Web media. Some Web media viewing solutions implement methodologies that require the use of a handheld remote control to locate Web media, and as such are typically not suitable for Web searching since they lack alphanumeric input capability.

Many websites offer media content and are structured such that users will remain within the confines of a specific content website, and through sharing, will encourage others to be brought to that same content website. If these websites offer the ability to construct a playlist, it is done within the confines of media available on the particular site. Other websites offer the ability to construct a playlist or bookmark list where media links and other web URLs may be saved, shared, and utilized for playback—however playback is performed on a PC, not a TV, and never using a TV server which is remotely controlled.

Given the desire to watch any web media on a family's primary TV set, and to control this operation from the comfort of one's couch, there is a need to operate a TV server remotely from a local PC or handheld remote control, and a further need to operate a TV server to view media links previously stored in a playlist. While it is known to operate a TV server from a handheld remote control, as in the case of the Apple TV, media players such as the Apple TV only allow viewing of media which can be located by navigating a predefined hierarchy of information. No provision is offered for allowing the user to perform a general Web search to locate and capture Web media, and then create a playlist incorporating the media links they have located, and then use that playlist to remotely control a TV server.

Within this specification:
- A "playlist" is an electronic list of electronic location references or "media links" which point to different forms of electronic media
- A "media link" may be a Web URL or alternately the file path and name for media stored on a LAN
- A "LAN" refers to the LAN in a home where a TV Server and TV are located
- "Media Server" and "TV Server" are synonymous—a computer with a video output connected to a TV set or Video Display that also plays conventional TV programming. The functionality that implements a "Media Server" or "TV Server" may physically reside either externally or internally to a TV set.
- A "LAN TV Server" refers to a TV server attached to the LAN in a home
- A "local TV server" or "TV server" refers to a TV server that is remotely controlled by either a local PC or handheld remote control, but which may not necessarily communicate with these controlling devices via the LAN.

A "Remote PC" refers to computer at a different physical location than the LAN TV server, i.e., not on the same LAN A "PC" can be any form of Personal Computer—Laptop, Desktop, Tablet PC, PDA, or Smart-Phone/PDA. For this invention, the PC is physically a different device than the TV server although a TV server may be implemented with what is conventionally known as a "PC". PCs can implement a "controller device" or a "capture device". Control and capture can be performed on the same PC or on different PCs. A "local controller refers" to any PC as defined above that is used as a controlling device for a TV Server, and that is at the same physical location as the TV server.

A "playlist function" is an application program running either locally on a PC with a local application window interface, or alternatively, on a website and controlled through the Internet by way of a browser interface. A playlist function is capable of storing and managing playlist files or databases.

A "Web playlist function" is an application program running on a website that communicates with PCs and LAN TV servers through the Internet, and is capable of storing and managing playlist files or databases.

SUMMARY OF THE INVENTION

According to this invention, a user may capture a media link on any PC and perform this capture function at any physical location, then save the media link in a playlist, and play the media located at the media link on a TV server, while controlling the TV server from another device—either a PC or a handheld remote control. Capture and play of playlists may be preformed simultaneously and in the same location, or alternately may be performed and different times and/or in different physical locations.

When the user plays, on the TV server, the media located at a media link, the system and method according to one embodiment of this invention further causes one of an open browser window, a new browser window, or a new tab in an open browser window on the TV server, to go to the URL location or file location corresponding to the media link, and display the media corresponding to the selected media link on a TV or video display connected to the TV server. In addition to streaming media located at a URL referenced by a media link, the act of playing the media located at a media link may cause an application window to open on the TV server that is appropriate for playing a specific type of file (AVI, WMV, MP3, MP4, JPG, PNG, etc.) corresponding to the media link, thereby displaying the media corresponding to the link on a TV or video display connected to the TV server.

The playlist may exist as a file or database stored on a local PC, a remote PC, on a LAN TV server, or on a website. When the playlist is stored on a website and accessed via the Internet, either a local PC or remote PC may access the playlist from the website to perform capture and edit functions or to play media on that PC. When a LAN TV server accesses the playlist from a website, the selection and play of media links that the user wishes to view on the TV is remotely controlled from a local device which may be either of a local PC or handheld remote control. The connection between a handheld remote control and the LAN TV server may be either of a LAN network connection or alternately a peer-to-peer connection. A peer-to-peer connection may be an infrared link or alternately a wireless RF connection.

A playlist file or database, or a link to a Web playlist, may be emailed by a user to a remote PC in order to share the playlist. A playlist or a link to a Web playlist may also be emailed to a remote TV server. Alternately, a sharing function may be incorporated into a Web playlist function whereby anyone owning a playlist may grant access to others in order to share a given playlist. Also, the TV server may communicate with the Web playlist function in order to convey authorized tracking and rating information. When the playlist is a file or database stored on a TV server, media corresponding to the media links in the playlist may be selected and played under the control of a handheld remote control that communicates with the TV server, or alternately under the control of an application program on a local PC by way of the LAN connection.

Capture

Media links may be captured by a number of methods. A media link URL may be added to the playlist by dragging the URL from a browser address bar and dropping it in the playlist application window (when the playlist is a resident program) or alternatively the Web playlist function interface browser window.

Alternatively, when the selected media link is the current address in a browser address bar, the action of selecting the media link for addition to the playlist may be performed by clicking a button in the browser window. This action causes a pop-up menu to become visible and the user chooses a desired action from the pop-up menu. The choices on the pop-up menu for the desired action can comprise the combination of one or more of at least the following:

a) adding the selected media link to the playlist
b) playing, on the local PC, the media corresponding to the selected media link
c) playing, on the LAN TV server, the media corresponding to the selected media link This action of selecting may also be performed by clicking a mouse button while hovering over the browser window and choosing a desired action from a pop-up menu. The media link to be added to the playlist may appear anywhere on a current page of a browser, or alternatively may be an entry on a file manager display (i.e. the "My Computer" window on Microsoft Windows operating systems), and the action of selecting is performed by clicking a mouse button while hovering over the specific link and choosing a desired action from a pop-up menu similar to that just described.

Preview Window

The playlist function may incorporate a preview mode that causes a preview of a selected video in the playlist to play in a preview window. The preview window appears as a pop-up window caused by a hover behavior where the cursor position is held stationary over a particular media link in the playlist display. A delay is typically included between the time the cursor assumes a stationary position over the media link and the time the preview window is activated. When a preview window is activated for a particular media link, the preview media is fetched either from a Web location according to the media link URL, or alternatively from a file location on the LAN. The preview video may be pre-stored on a TV Server or PC to minimize any delay in response to activating the preview. The pre-storing of this information may be done in the background as a low priority operation after the user has captured the media link in a playlist. A preview video would typically appear in a pop-up window activated by a button on the Local PC or on a handheld remote control. If a LAN TV server is being controlled remotely by a Local PC, the preview window could appear on the LAN TV server or on the local PC, or simultaneously on both, depending upon the user's preference. A preview video may contain only the first few seconds of a selected video, or alternatively can start a stream of the video, displaying the video for as long as the user wishes. It may include a selected highlight from the video. The preview window is typically greatly reduced in size from a full screen display, and therefore requires much less bandwidth and or storage space than a video to be played full screen.

When a LAN TV server is remotely controlled by a local PC, it may be desirable for either previews of the selected media, or the media itself, to display simultaneously on the LAN TV server and on the local PC. This can be accomplished by utilizing a multicast methodology where the same stream of information is sent to both the LAN TV server and the local PC at the same time.

Sequential Play

A playlist may be organized sequentially, such that media corresponding to sequential media link entries in the playlist may be played sequentially. When the selection of a media link and the action of playing a media link are separate actions, the playlist function may be configured such that the action of playing a particular selected media link may automatically cause the next sequential entry in the playlist to be selected (in order to be the next media link to be played). Carrying this further, it is possible to determine when the play of a particular video has ended and automatically start the next sequential entry in the play list. In this manner, a list of short videos can be concatenated in a playlist, and the user may initiate the play of the multiple short videos such that they will all play in sequence with no further action on the part of the user, the next video automatically starting after the preceding video ends.

Integration of other Playlists

Since there are a number of generic and also content specific media playlist functions available to a user from a variety of content and software providers, it is desirable to add a function where a playlist can automatically consolidate other (foreign) playlists. This function extracts media links from other playlists that may reside either on a local PC or a TV server, or on the Web. Their formats are automatically translated into the format of the primary or native playlist.

Integration of Advertising

When a user assembles a media playlist they have essentially defined their preferences in the type of media they typically view as well as some of their lifestyle preferences— including by inference the kinds of products and services they may often purchase. When a user is viewing a media playlist there is an opportunity to show advertising as part of the display. While this is well known for search engine advertising schemes as well as banner ads on websites in general, including content websites, targeted advertising has not been applied to a playlist function that is used to remotely control a TV server. This targeted advertising function can be implemented by displaying advertisements adjacent to the playlist media links where the specific advertising is chosen for its relevance to the material contained in the media link currently selected—or material contained in media links positioned in close proximity within the playlist to the media link currently selected.

BRIEF DESCRIPTION OF THE DRAWINGS

FIG. 2 shows an alternate form of a playlist user interface representation according to this invention.

DETAILED DESCRIPTION OF THE INVENTION

Figure 1:
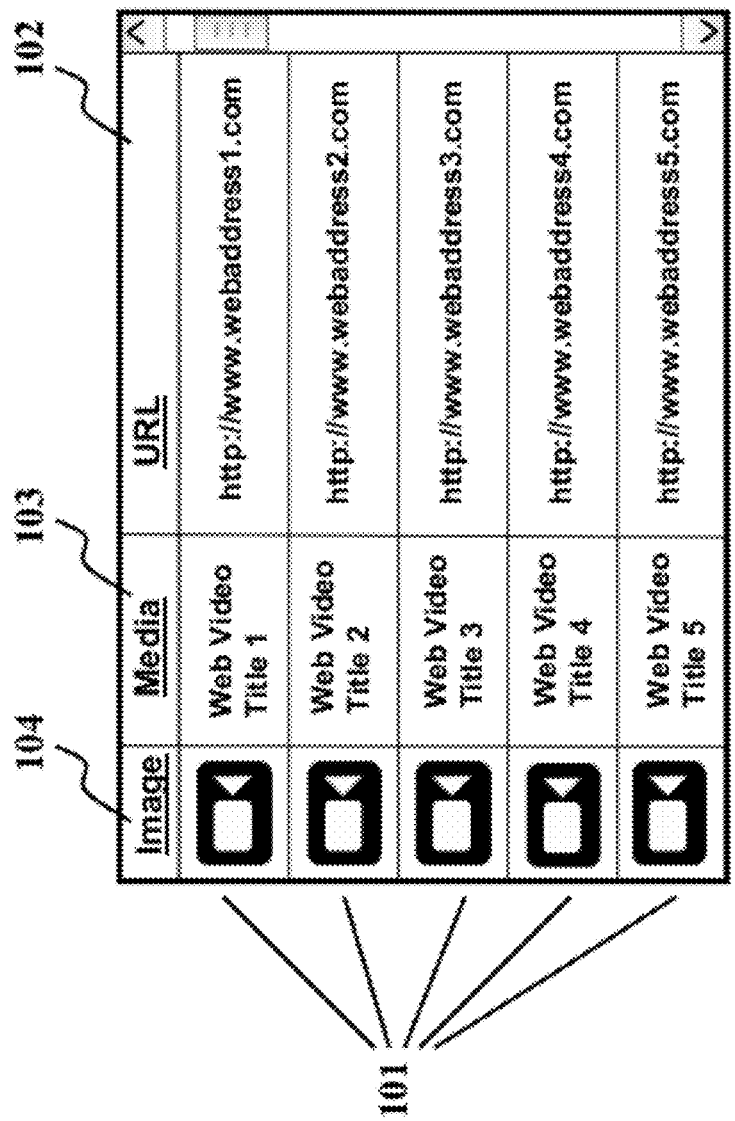
FIG. 1 shows a playlist user interface representation according to this invention.

It is well known in the art to create bookmark lists and playlists, pointing not just to Web media, but to all types of information stored at Web URLs. Two example formats for prior art media playlists are shown in FIGS. 1 and 2. FIG. 1 shows each media entry 101 including not only the URL media link location 102, but also a simple name for the link 103 and a thumbnail image 104. FIG. 2 shows a playlist where a specific ordering number 201 indicating sequential positioning of a link is shown along with a checkbox 202. One typically uses this checkbox in order to delete a link or alter the sequential position of a link. The playlist of FIG. 1 can be implemented such that the user to simply drags and drops a media link—moving it up or down the list in order to change its sequential position. Both formats have their advantages and disadvantages. Other formats also exist.

Figure 3:
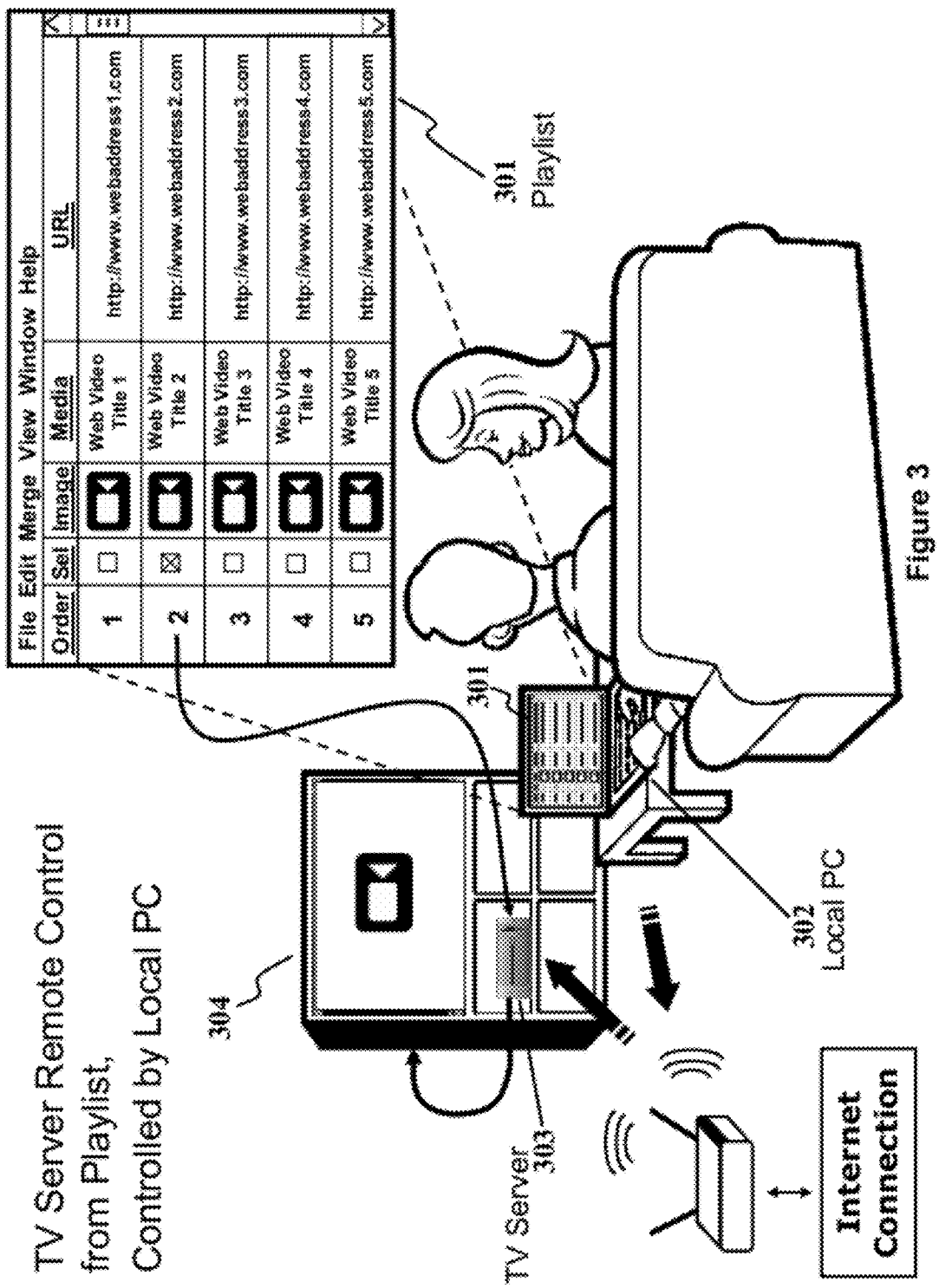
FIG. 3 shows a playlist user interface as seen on a local controller PC which in turn controls a local TV server.

FIG. 3 shows a high-level view of a system used in the home environment according to this invention, where a previously captured playlist 301 is viewed on a local PC 302, and media links selected from this playlist are sent in some fashion to a TV server 303 such that the media located at those links may be played on the TV.

Figure 4:
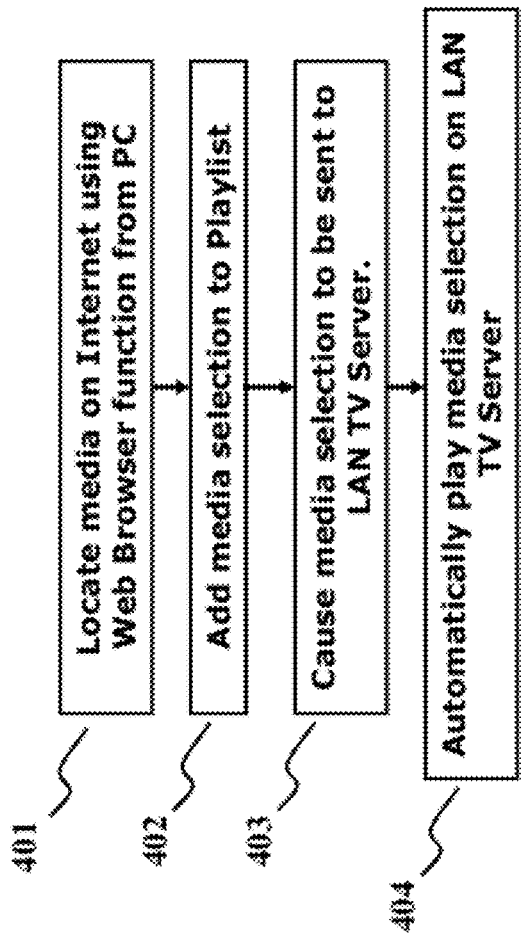
FIG. 4 shows a flowchart for the process of media link capture and play.

Media links may be captured in a playlist by a variety of scenarios, and local PC 302 shown in FIG. 3 may be used for both capture and play of media links. FIG. 4 describes a method according to this invention for both capture and play. First a web browser function on the local PC is used to locate 401 media on the Internet. Links to these media locations are then captured and added 402 to the playlist. The local PC may then cause a selected media link from the playlist to be sent 403 to the LAN TV server. And last, the media located at the media link sent to the TV server is automatically played 404 on the TV server, and displayed on the TV screen.

Figure 5:
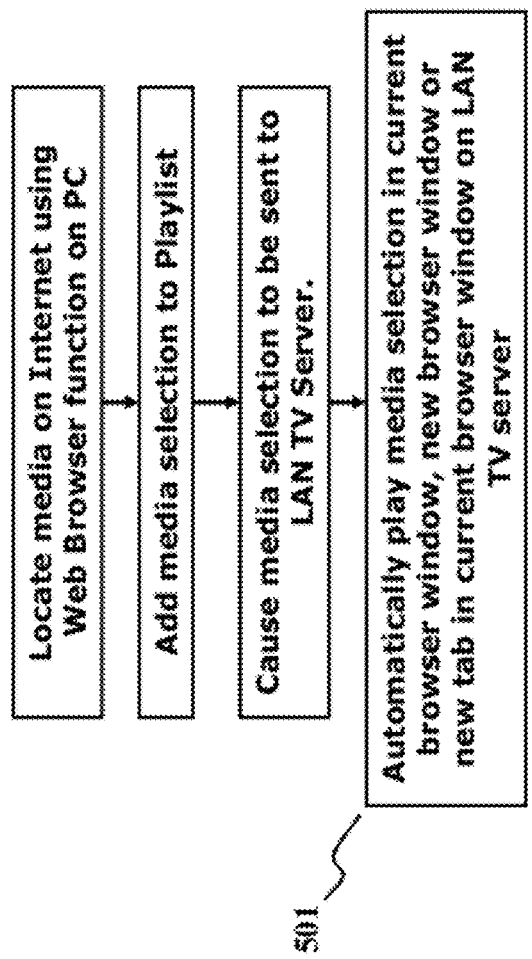
FIG. 5 shows a flowchart for an alternate form of a process for media link capture and play.

FIG. 5 shows a similar flow for capture and play, but further describes the action of automatically playing the media link on the TV server. Here the action initiated by the playlist function on the local PC causes the media link to be played 501 on the TV server in a current browser window, a new browser window, or a new tab in a current browser window, with any new windows automatically popping-up on the TV server.

Figure 6:
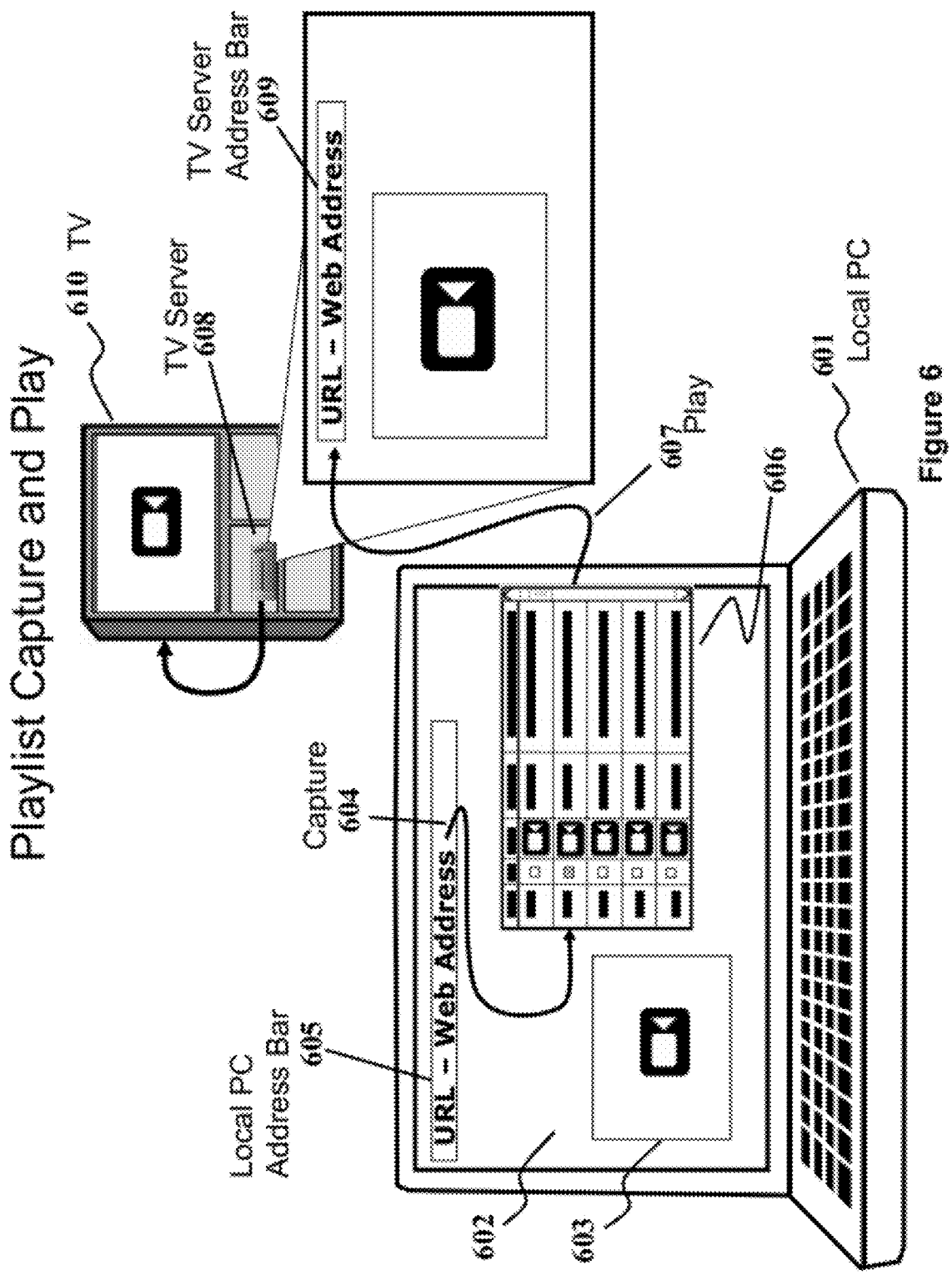
FIG. 6 shows a detailed description for playlist capture and play using a local PC controller device and a local TV server.

FIG. 6 shows a graphical view of the living room scenario of FIG. 3, further describing a possible method for playlist capture and play. Here the user has located, on a local PC 601, a webpage 602 that contains a video 603 they would like to add to the playlist. They capture 604 the URL for this webpage (located in the local PC address bar 605) and add this media link URL to the playlist 606. Subsequently, or simultaneously, they have selected this same media link to be played 607 on the TV server, and through mechanisms and methods to be described in this specification, the selected media link is passed to the TV server 608 where it is entered in the address bar 609 of a web browser instance, causing the selected video to play on the TV server thereby being displayed on the TV screen 610.

There are a variety of methods which may be used to capture a media link URL in order to add the media link to a playlist. One possible method, consistent with the local PC display shown in FIG. 6, is to drag (using the cursor with mouse button depressed) the media link from the local PC address bar and drop it into the playlist window. Alternately the media link URL can be copied from the local PC address bar, using the PC's "copy" and "paste" commands, and then pasted into the playlist window.

Figure 7:
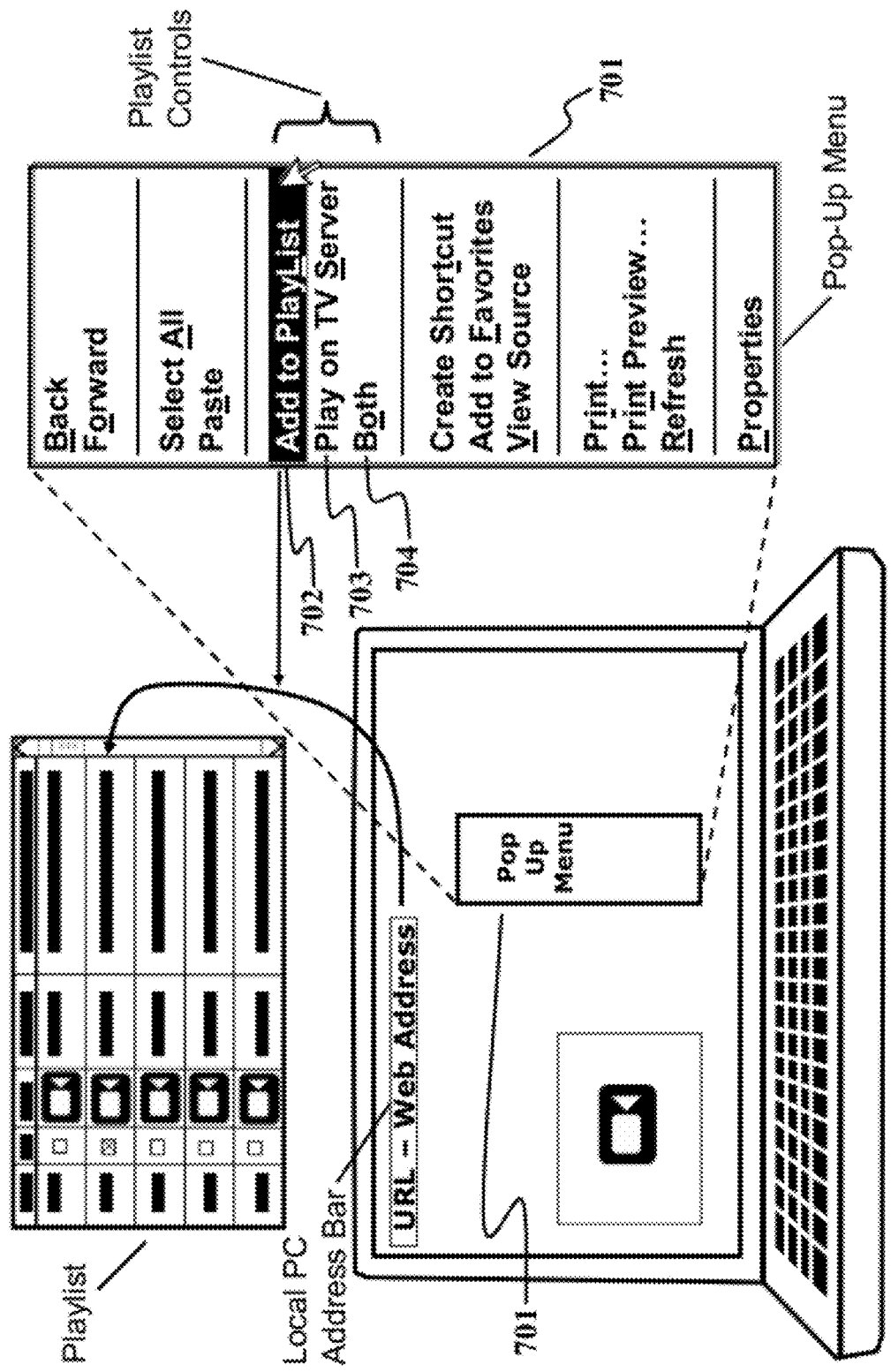
FIG. 7 shows alternative playlist capture paradigms.

Yet another possible method for capturing a media link URL is shown in FIG. 7. Here, the user locates, in an active browser window, a media webpage or media link that they wish to add to the playlist, and with their mouse (cursor) hovering somewhere over free-space in the browser window, or over the browser address bar specifically, or over a hyper-link displayed in the window, and then right-clicks in order to display a pop-up menu 701. In the pop-up menu there are number of selections that have been added specifically for playlist controls. Possible menu selections include "add to playlist" 702, "play on TV server" 703, or "both" 704 as shown. Other action choices could be added to this list including "share with others", "add to playlist with rating", to name a few. Adding a rating may be especially useful at a later time or if the playlist is to be shared. As an alternative to right-clicking in order to display a pop-up menu, specific buttons or a "gadget" may have been previously added to the browser as plug-ins, and activation of these controls can either provide a pop-up menu or directly execute some of the functions described in this paragraph.

Figure 8:
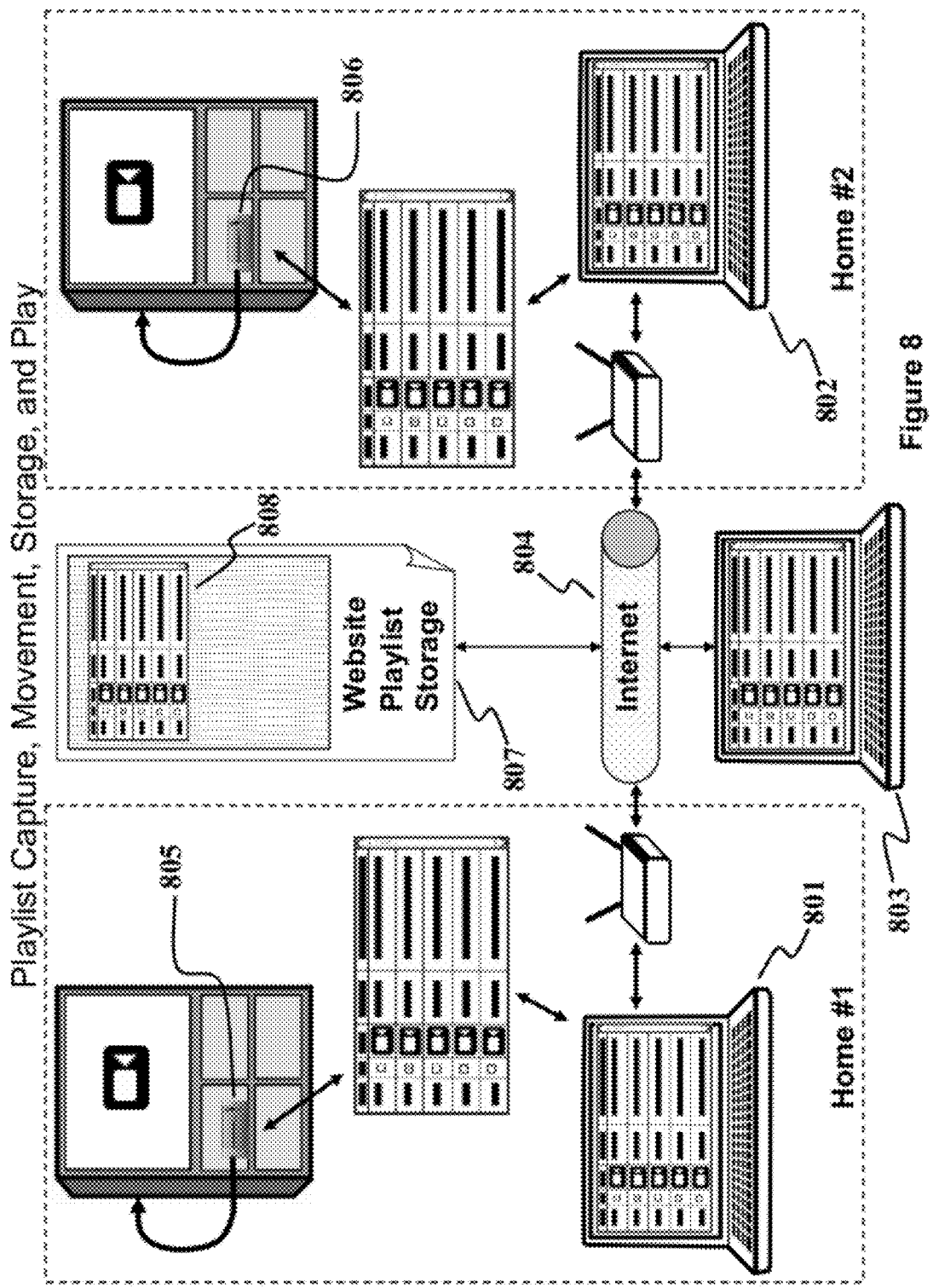
FIG. 8 shows a diagram depicting playlist capture, movement, storage, and play including website playlist storage.

FIG. 8 shows a big-picture overview of how playlists may be captured, moved, stored, and played. A playlist may be captured on a local PC within the home (801, 802), or on a remote PC 803 located anywhere and connected to the Internet 804. Playlists may be emailed or shared between one PC and another PC or between a PC and a TV server (805, 806). A playlist may be used in a first home to control a local TV server 805, and also shared with someone who uses it in a second home to remotely control a different TV server 806. A playlist may be stored as files on PCs or alternately saved on a website 807. Playlists may also be stored as a database. In addition to sharing playlists via email or moving files through a LAN, files may also be shared by passing them through a sharing facility implemented on a website 807 as part of a Web playlist function 808.

Figure 9:
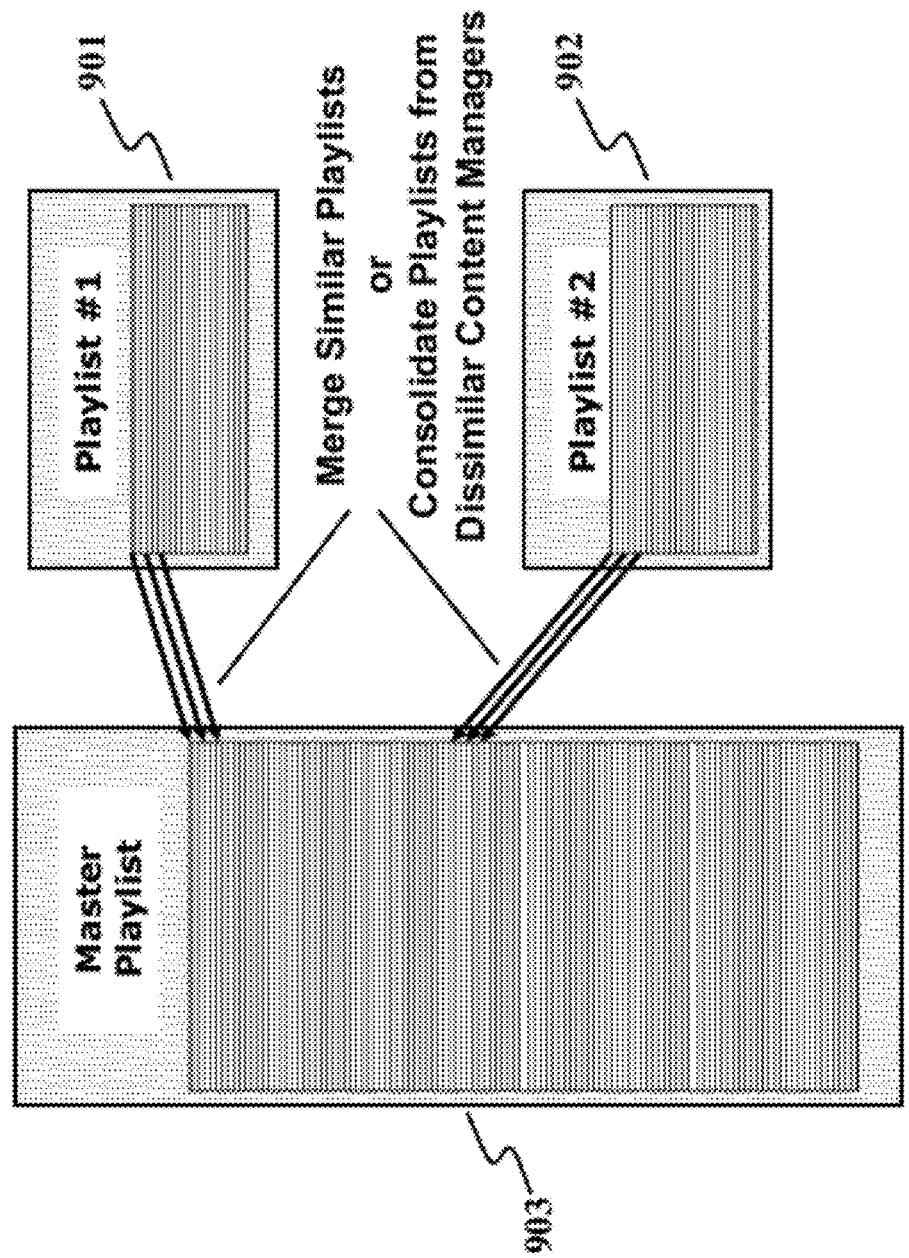
FIG. 9 describes playlists as a set of list files and describes the merger of similar playlists or consolidation of playlists from dissimilar content managers.

FIG. 9 shows the paradigm where multiple playlists (901, 902) are kept as separate files and may, at the user's discretion, be merged or consolidated to create a master playlist file 903.

Figure 10:
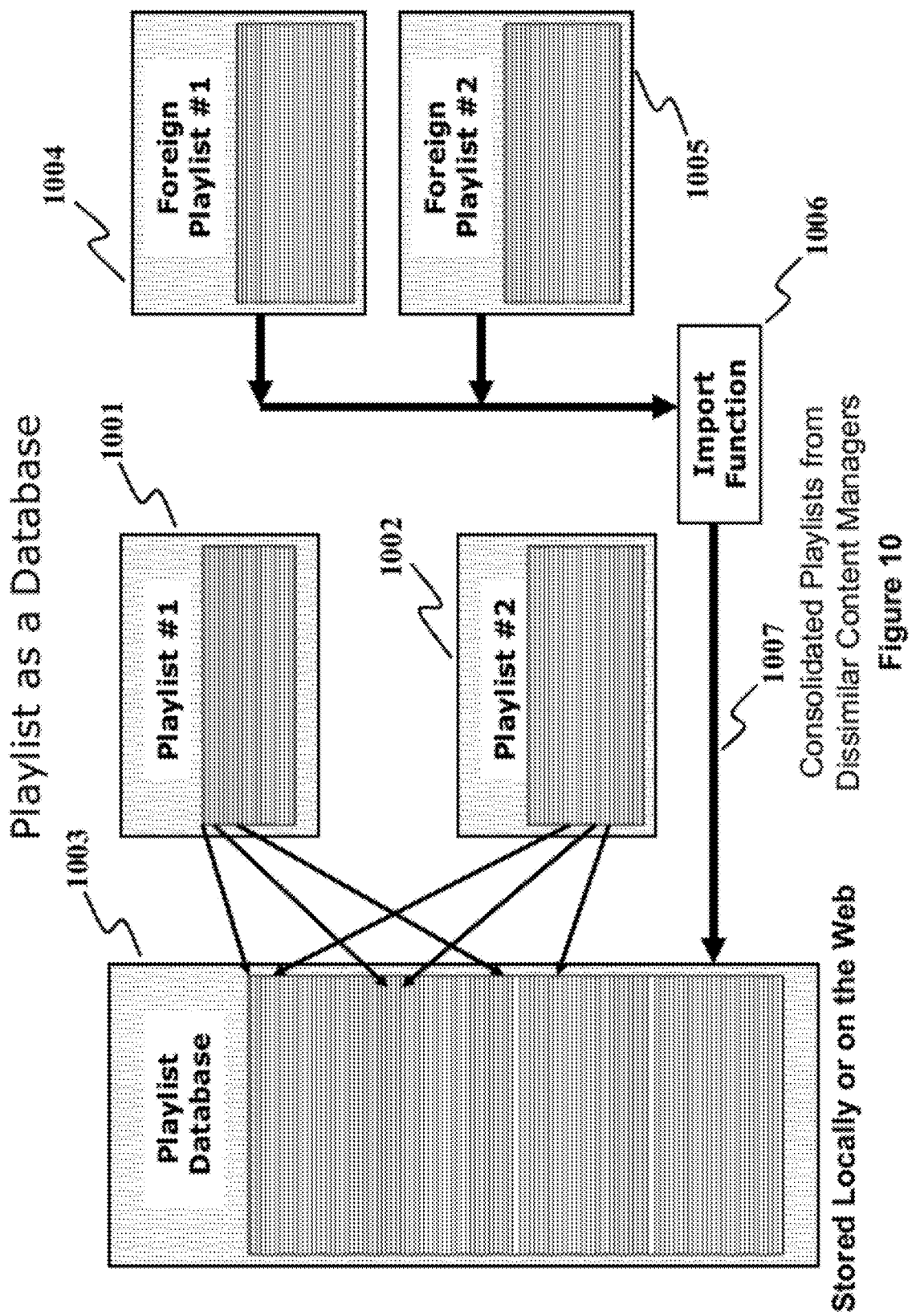
FIG. 10 describes playlists implemented as databases.

FIG. 10 shows an alternate paradigm where multiple playlists (1001, 1002) comprise pointers into a playlist database 1003 where all playlist information is kept. This database may be stored locally or on the Web. Multiple physical copies of the database may be kept, and automatic synchronization between multiple database copies may be performed. Playlist information from foreign playlists (1004, 1005), having incompatible playlist formats and implemented with either separate files or as databases, may be imported by way of an import function 1006 such that information from the foreign playlists is consolidated 1007 into the main or native playlist database.

Figure 11:
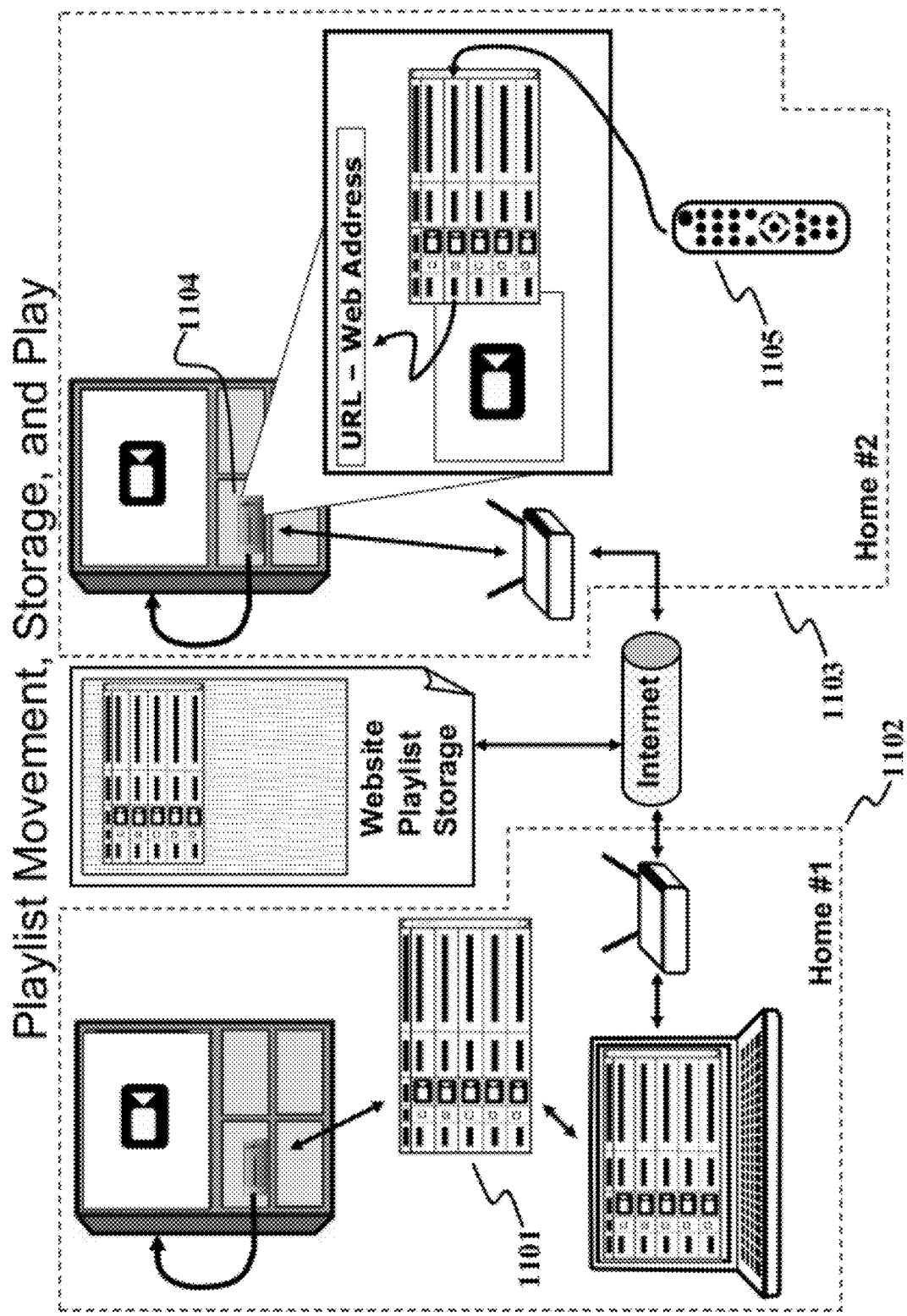
FIG. 11 shows playlist movement, storage, and play, including website playlist storage, and playlists created within one home and shared with users at another home.

FIG. 11 shows a scenario where a playlist 1101 that has been captured and viewed within a first home 1102, is shared with a second home 1103 by making the playlist available on a second TV server 1104 in the second home, that second TV server being controlled in this instance by a handheld remote control 1105.

Figure 12:
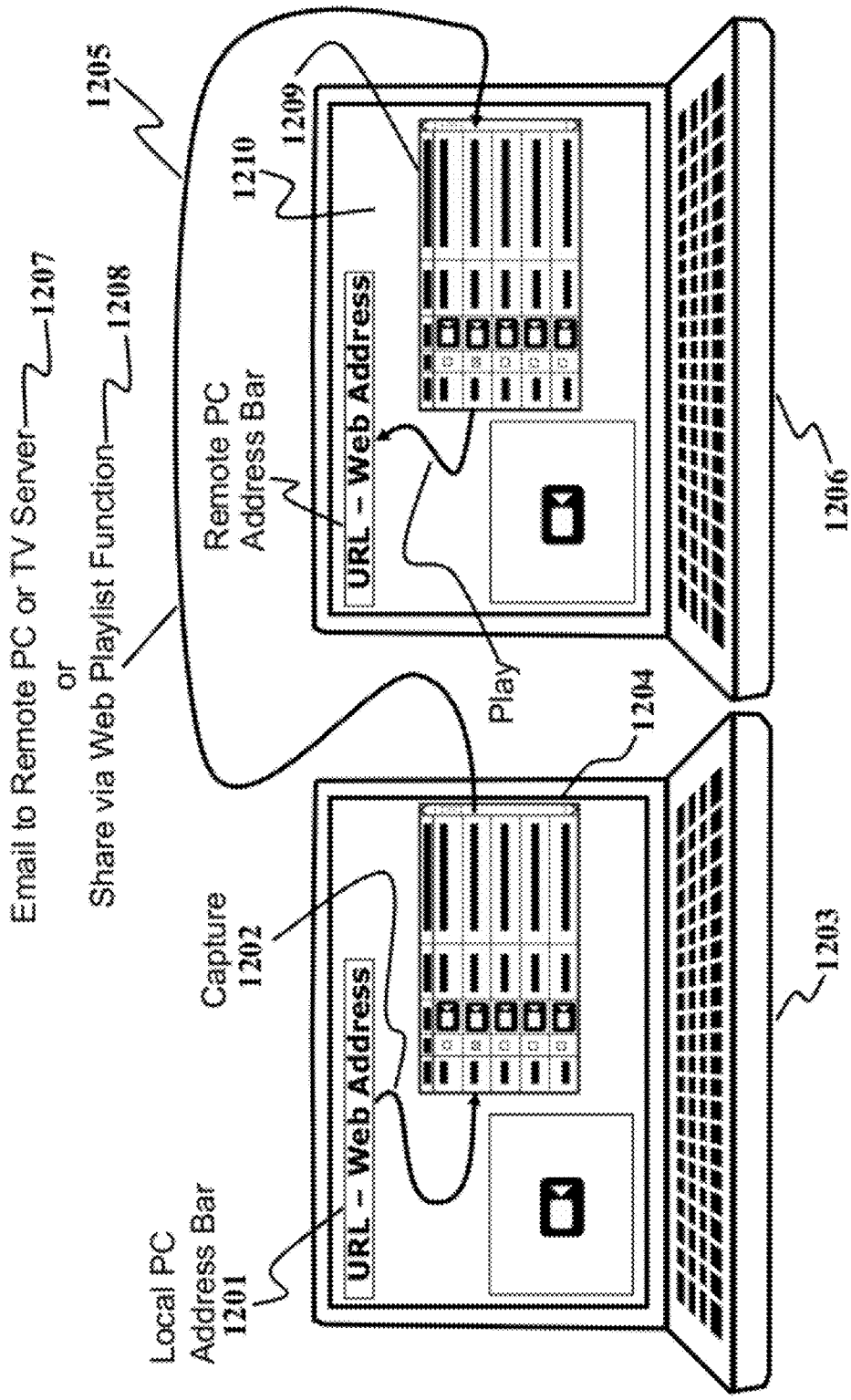
FIG. 12 shows playlist capture, storage, movement and play, where a playlist is created on one PC and shared with someone who views media according to the same playlist on another PC or a TV server.

FIG. 12 graphically demonstrates the scenario where a media link 1201 is captured 1202 on a first PC 1203 and placed in a first playlist instance 1204 which is then shared 1205 with a second PC 1206 by way of either email 1207 or a web playlist function 1208. The second PC 1206 then accesses the shared playlist 1209 in order to select media links and cause them to be played in a local browser window 1210 on the second PC. While a laptop computer is shown for the second PC, the second PC could be any form of PC—a laptop, desktop, TV server, PDA, or smart phone/PDA.

Figure 13:
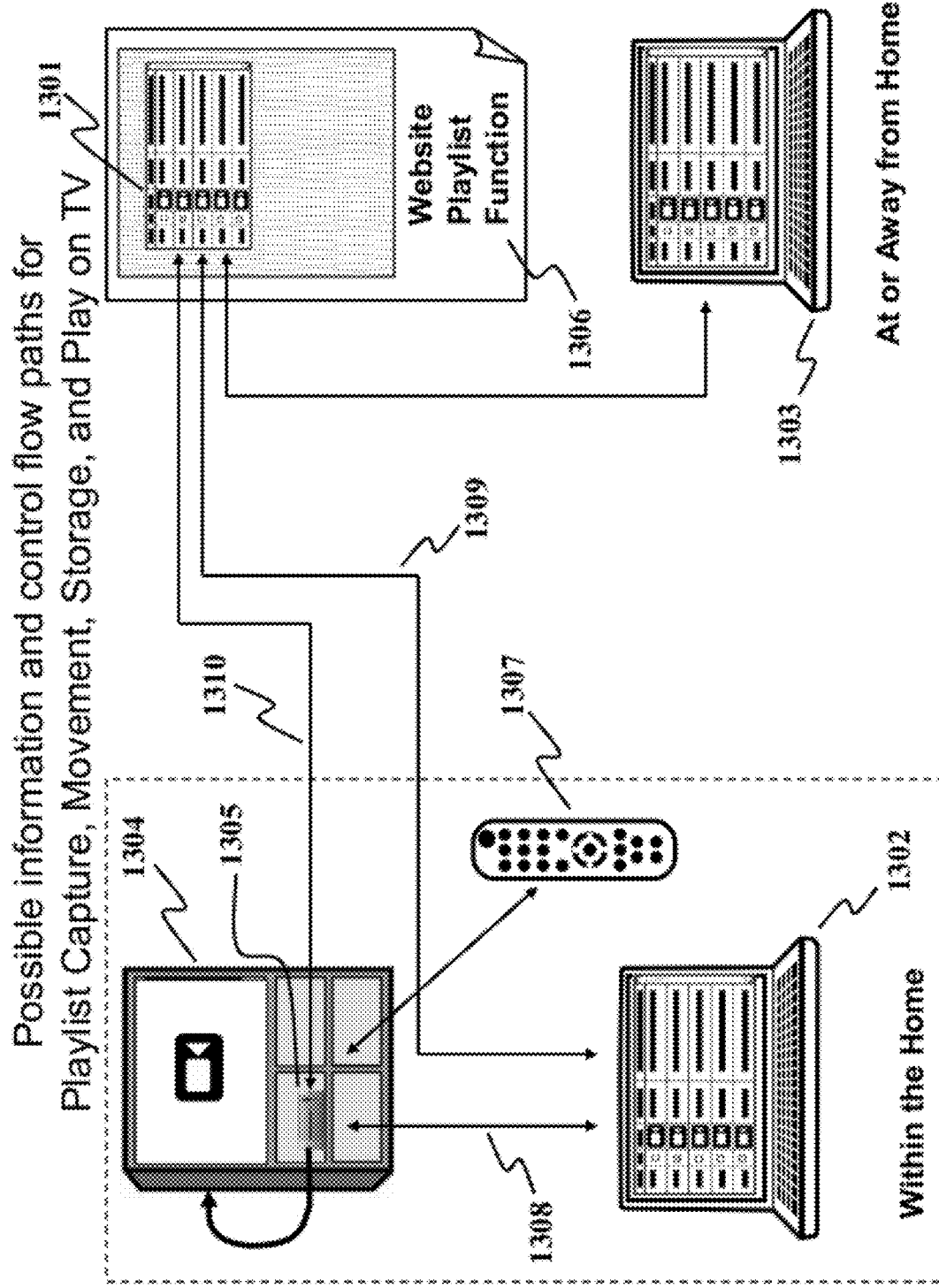
FIG. 13 shows the possible information and control flow paths for playlist capture, movement, storage, and play, when utilizing a Web playlist function.

When the playlist resides on a website implemented as a Web playlist function, the playlist is accessed from different PCs by way of a browser interface or an application program running on the PC which communicates via the Internet. Accessing a Web playlist function using a browser interface is a simpler path for users. Implementations can be created where users can start using the Web playlist function without installing special software on the PC, a significant advantage. FIG. 13 shows the possible information and control flow paths for playlist capture, movement, storage, and play, when utilizing a Web playlist function to manage a playlist. The playlist 1301 may be captured from either a PC 1302 within the home or a PC 1303 that is remote. When the user wishes to play Web media viewed on their TV 1304, the local TV server 1305 must access the Web playlist function 1306. The local TV server 1305 may be controlled by either a local PC 1302 or a handheld remote control 1307 that is also located locally. If a local PC is used to control the local TV server, the control path may either be a direct path within the home 1308, or alternately an indirect path where the local PC 1302 communicates 1309 with the Web playlist function 1306 which in turn communicates with and controls the local TV server 1305.

Figure 14:
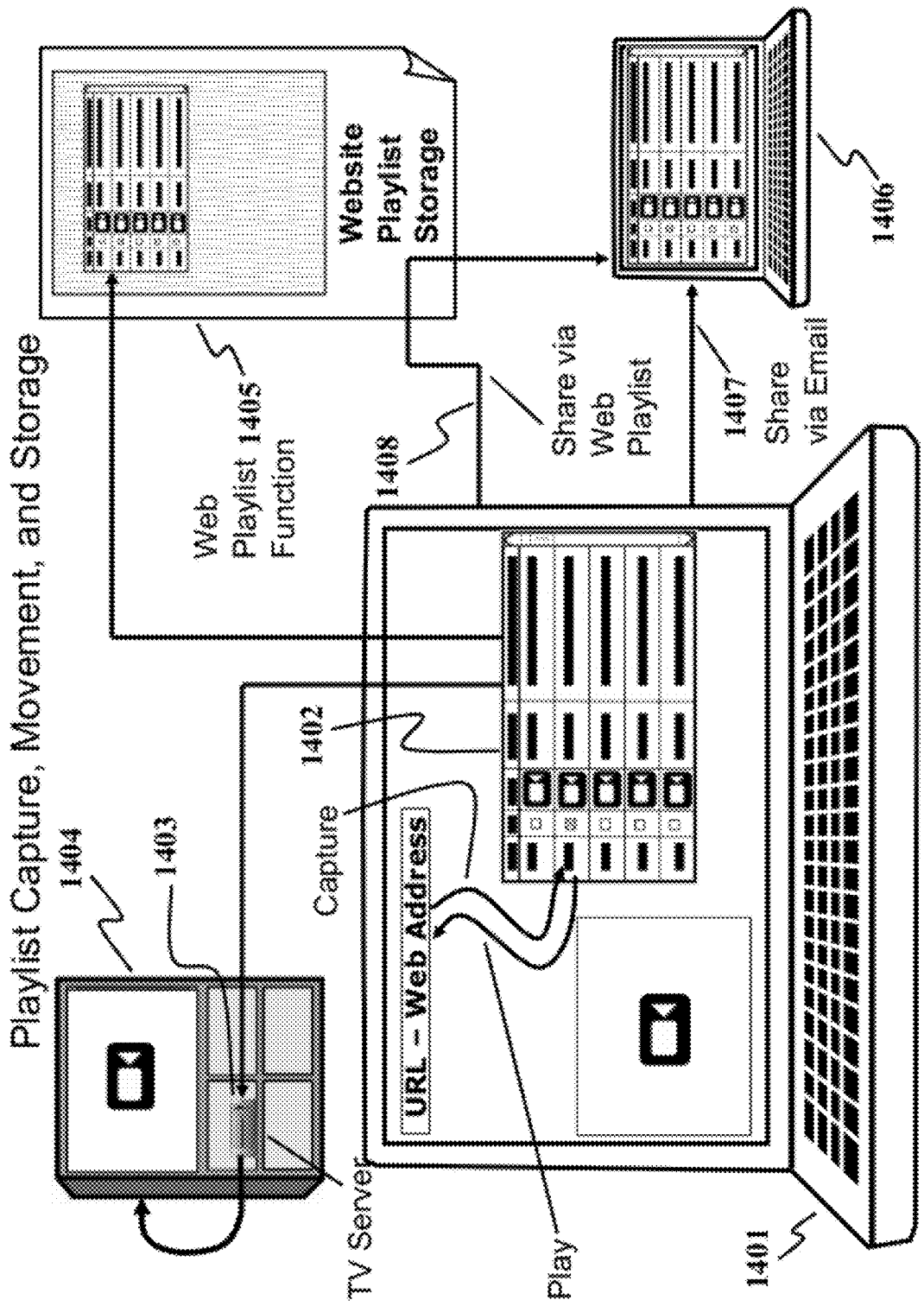
FIG. 14 shows the scenarios where the playlist is captured on a local PC.

FIG. 14 shows the scenarios where the playlist is captured on a local PC 1401. Media listed in the playlist 1402 may then be played on local PC 1401 itself, or on the local TV server 1403 for viewing on a TV 1404. The playlist may be maintained on the Web playlist function 1405 and accessed via the Internet. The playlist may also be shared with another PC 1406 either by email 1407 or by a sharing facility 1408 built into the Web playlist function.

Figure 15:
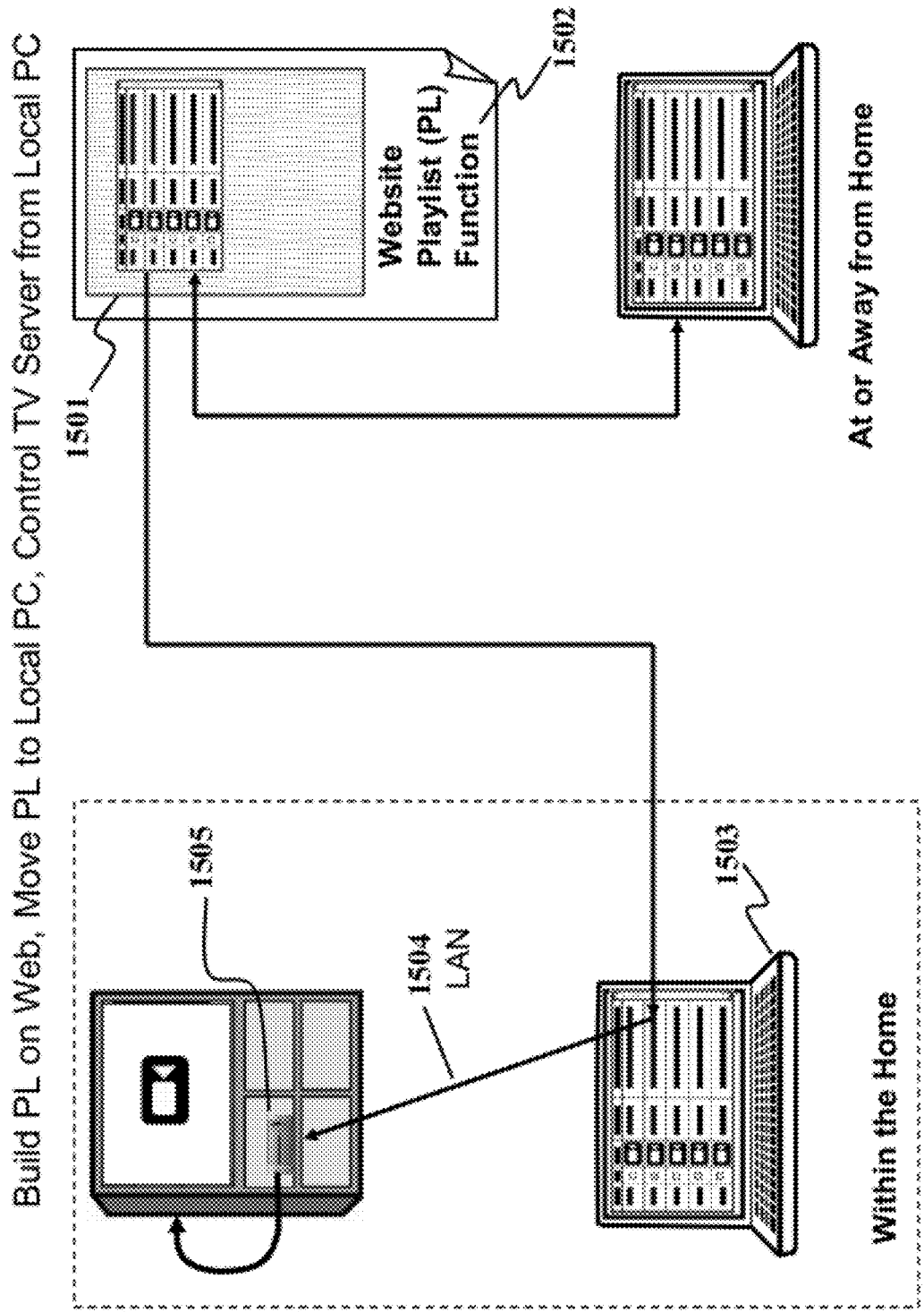
FIG. 15 shows the scenario where the playlist is maintained within a Web playlist function which interfaces with a local PC within the home.

FIG. 15 shows the scenario where the playlist 1501 is maintained within the Web playlist function 1502 which interfaces with a local PC 1503 within the home. When the user wishes to watch playlist media on their TV in this scenario, the playlist information is conveyed through the LAN 1504 from local PC 1503 to the LAN TV server 1505, and the LAN TV server is then controlled by local PC 1503.

Figure 16:
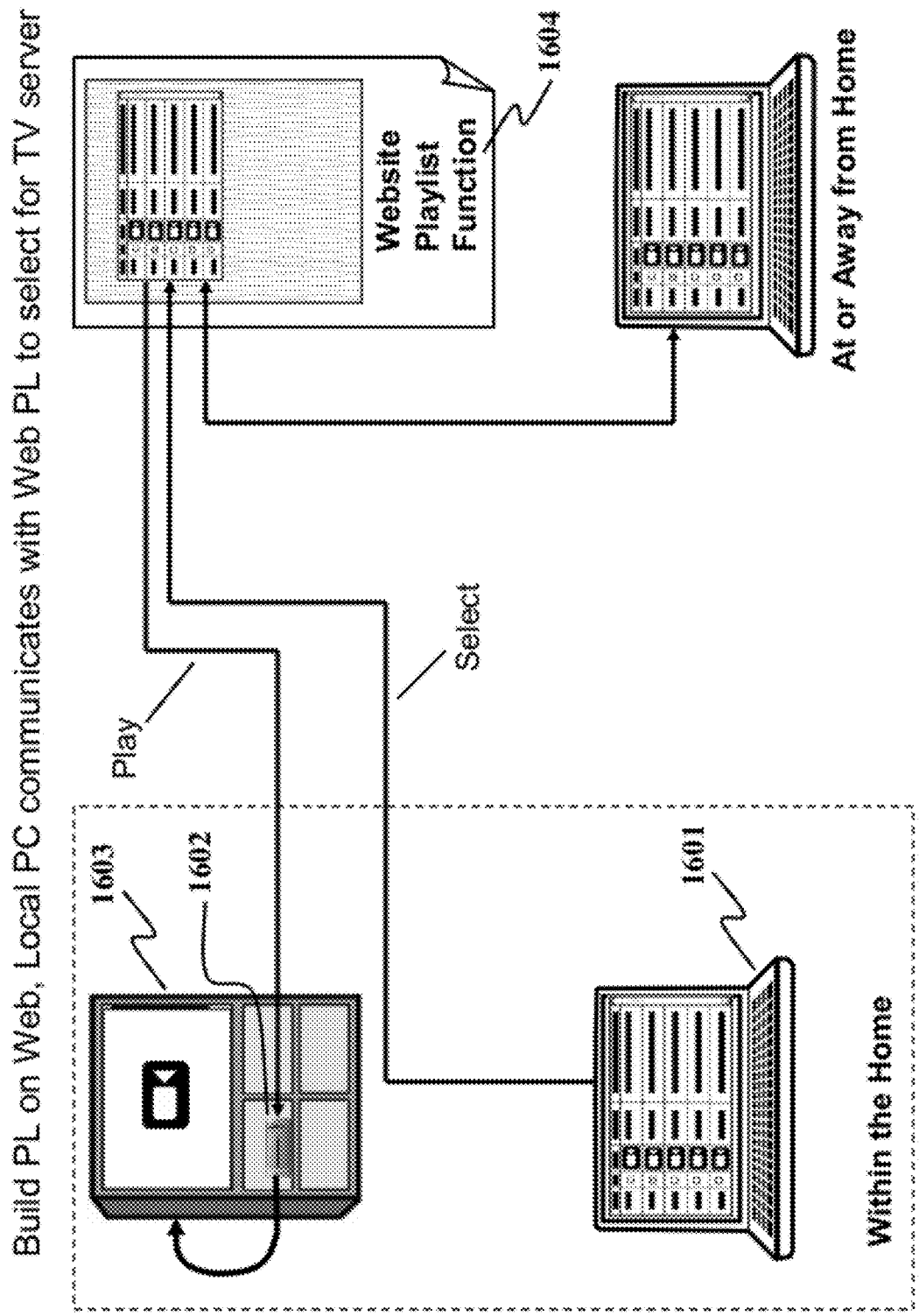
FIG. 16 shows a local PC controlling a local TV server, however the playlist information is maintained solely on a Web playlist function, and the control of the TV server by the local PC is indirect, occurring solely via the Web playlist function.

FIG. 16 shows an alternate scenario where the local PC 1601 controls a local TV server 1602 in order to watch playlist media on the TV 1603, but the playlist information is maintained solely on the Web playlist function 1604, and the control of TV server 1602 by local PC 1601 is indirect—via the Web playlist function. Here, local PC 1601 communicates with Web playlist function 1604 via the Internet including the communication of selection commands intended for local TV server 1602. Local TV server 1602 then communicates via the Internet with Web playlist function 1604 in order to receive commands regarding which media links are to be accessed for play. In this manner, local PC 1601 and the local TV server 1602 both must communicate with the Internet, but do not have to communicate directly with each other through a LAN. This scenario may be especially advantageous for many users since it is easier when setting up computers in the home for them to communicate with the Internet than to communicate with each other. Many homes exist with multiple computers where each computer talks successfully to the Internet and, although all computers in that home are connected to the same LAN, the computers are not visible to each other for the purpose of moving files for communicating between them. This is a significant problem within the industry that heretofore has not been solved.

Figure 17:
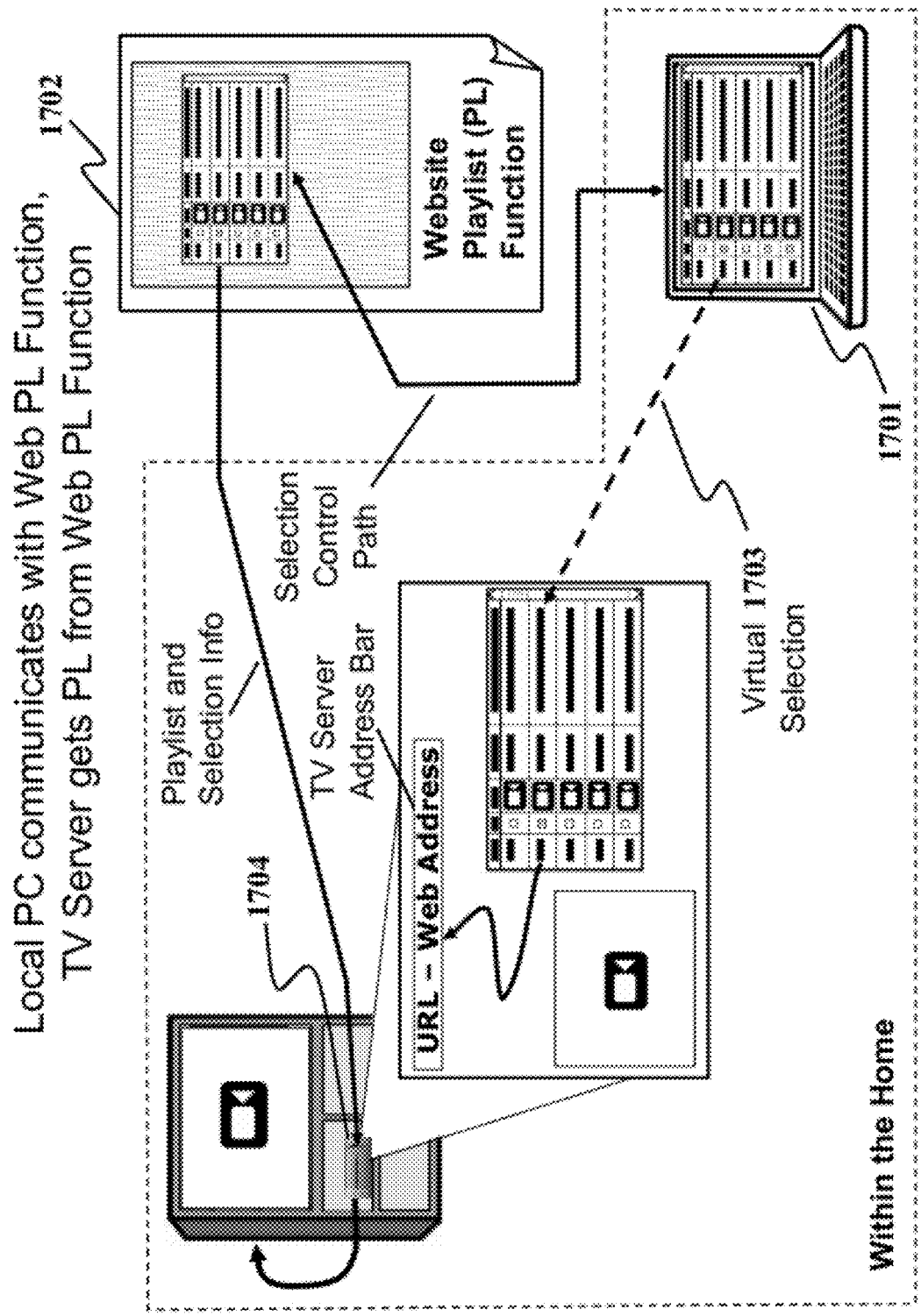
FIG. 17 shows a variation on the graphical representation of the scenario of FIG. 16.

FIG. 17 shows a variation on the graphical representation of the scenario of FIG. 16. Again, the local PC 1701 communicates with the Web playlist function 1702 in order to select media links 1703 to be played, Web playlist function 1702 in turn communicating with the local TV server 1704 in order to cause the selected media links to be played. Even though local PC 1701 and TV server 1704 are not communicating directly with each other, it appears to the user of local PC 1701 that they are in control of TV server 1704 and in a virtual manner, are effectively making a direct selection the TV server 1704.

Figure 18:
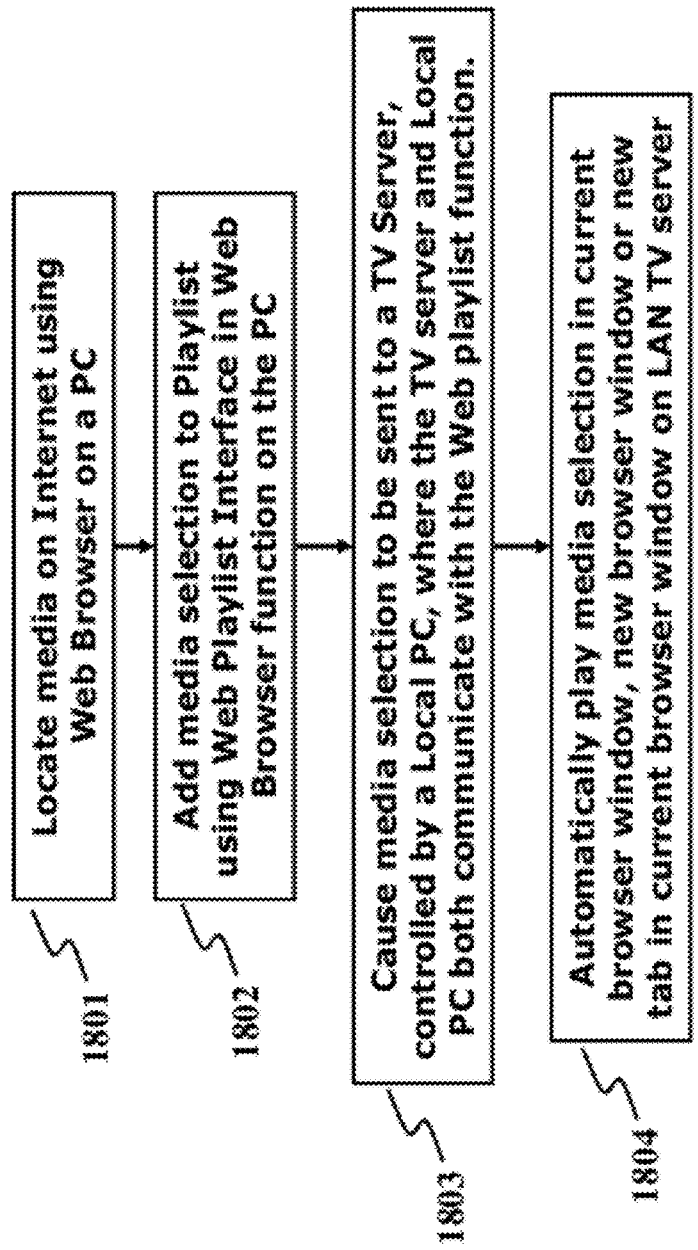
FIG. 18 shows the process flow relative to the scenario of FIG. 17, including the media link capture process.

FIG. 18 shows the process flow relative to the scenario of FIG. 17, including the media link capture process. First media is located 1801 on the Internet using a Web browser on the PC, and then is added 1802 to the playlist using a playlist interface function running in a Web browser on the PC. The playlist interface function conveys media links to the Web playlist function for storage and management. When the user wishes to select a media link from the playlist in order to watch the selected media on the TV, the Web playlist function sends 1803 the media link to the TV server, effectively under control of the local PC acting via the Internet. Then, the media link is played 1804 on the TV server in a current browser window, a new browser window, or a new tab in a current browser window, with any new windows automatically popping-up on the TV server.

Figure 19:
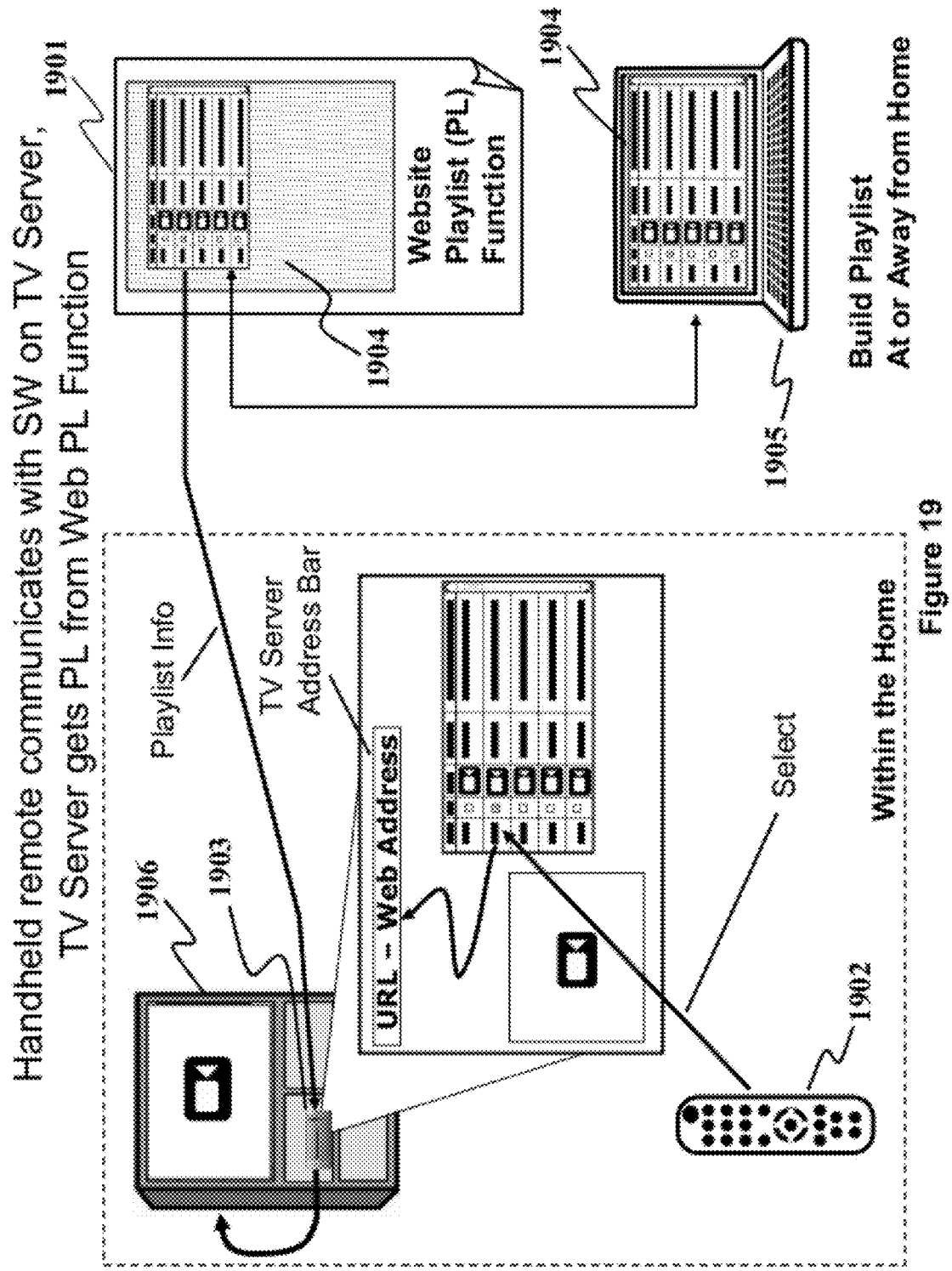
FIG. 19 shows another scenario where a Web playlist function is utilized, however in this case, a handheld remote control is used to control a TV server.

FIG. 19 shows another scenario where a Web playlist function 1901 is utilized, however in this case, a handheld remote control 1902 is used to control TV server 1903. Here, a playlist 1904 has previously been constructed by capturing media links on a PC 1905 which may be either local or remote. Once a playlist has been created, it is accessed by TV server 1903 by way of the Internet. An application running on the TV server interfaces with the Web playlist function, displays a playlist on TV screen 1906, and communicates with handheld remote 1902 operating locally which is used to select the media to be played. TV server 1903 then retrieves the media information to be played from either a web URL referenced by a media link or alternately a file location on the LAN. Handheld remote control 1902 may communicate with TV server 1903 by either an infrared link or alternately a wireless link, a wireless link being either an infrastructure (LAN) connection or alternately a peer-to-peer connection.

Figure 20:
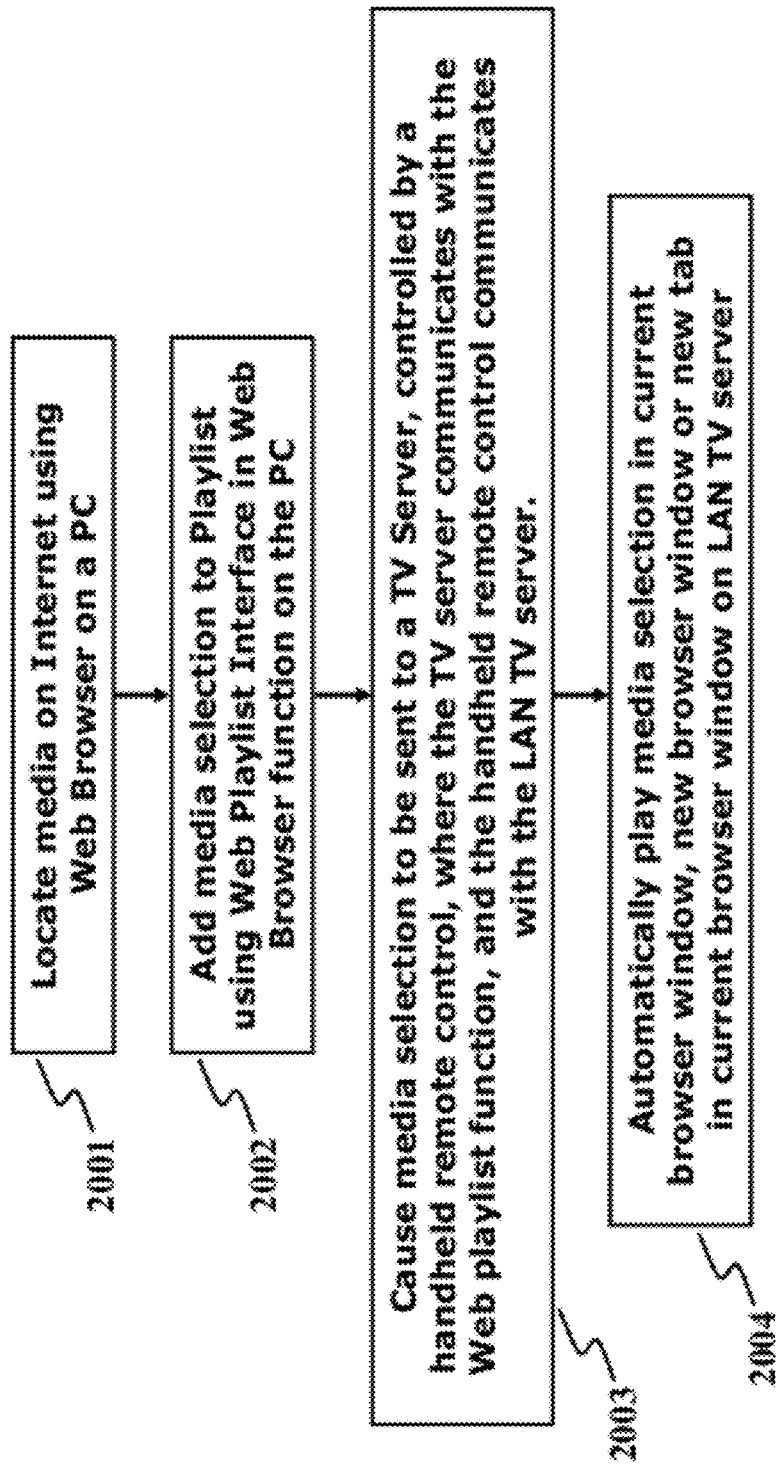
FIG. 20 shows the process flow for the graphical representation shown in FIG. 19.

The process flow for the graphical representation shown in FIG. 19 is shown in FIG. 20. Here the user locates 2001 media on the Internet using a Web browser on a PC and adds 2002 that media to a playlist stored within the Web playlist function on the Internet, the Web playlist function being controlled by a corresponding Web playlist interface function running in a Web browser on the PC. Then, a handheld remote control communicates directly with the TV server in order to choose media from the playlist utilizing an interface to the Web playlist function. The selected media link is sent 2003 to the TV server by the Web playlist function and causes the media link to be played 2004 on the TV server in a current browser window, a new browser window, or a new tab in a current browser window, with any new windows automatically popping-up on the TV server.

Figure 21:
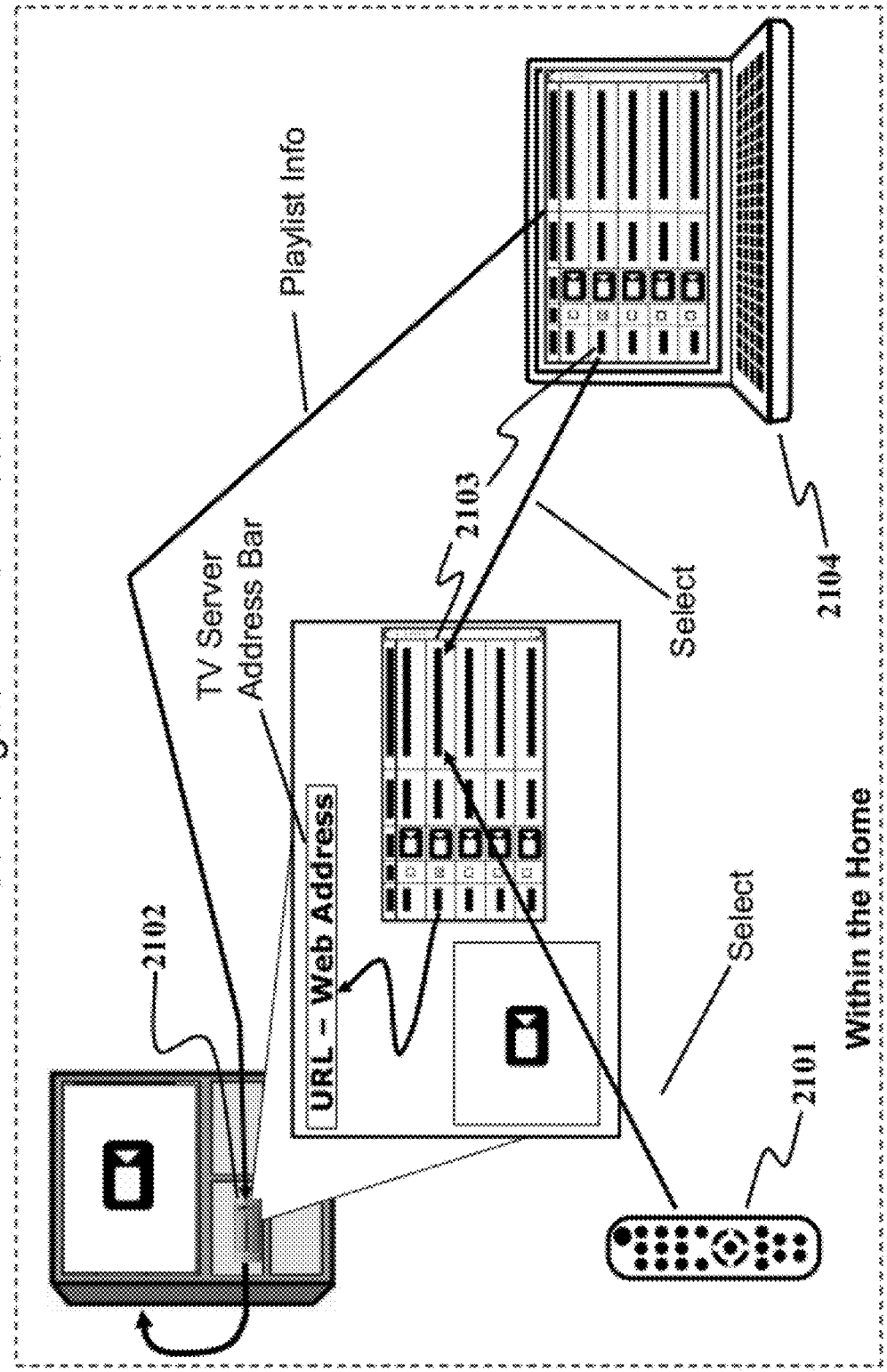
FIG. 21 shows a playlist that has been previously captured on a PC and is later transferred to a TV server either through the Internet or through a LAN.

If a handheld remote control 2101 is used to control the TV server 2102, and a Web playlist function is not utilized, software running on TV server 2102 must receive playlist info in order to display the playlist on the TV and respond to selection commands from the handheld remote control. This scenario is shown in FIG. 21 where a playlist 2103 has been previously captured on a PC 2104 and later transferred to TV server 2102 either through the Internet or through a LAN. An application program running on TV server 2102 is capable of displaying playlist 2103 and responding to selection commands from handheld remote control 2101. Alternately, once the playlist information has been transferred to TV server 2102, selection of media to be played may also be made under control of local PC 2104 by way of a LAN or peer-to-peer connection.

Prior art playlists often show a thumbnail image of the media for each entry. It is also known to utilize a hover behavior where placing the mouse (cursor) over a link or playlist entry will pop-up a window containing a synopsis of the media and often a larger version of the thumbnail image.

Figure 22:
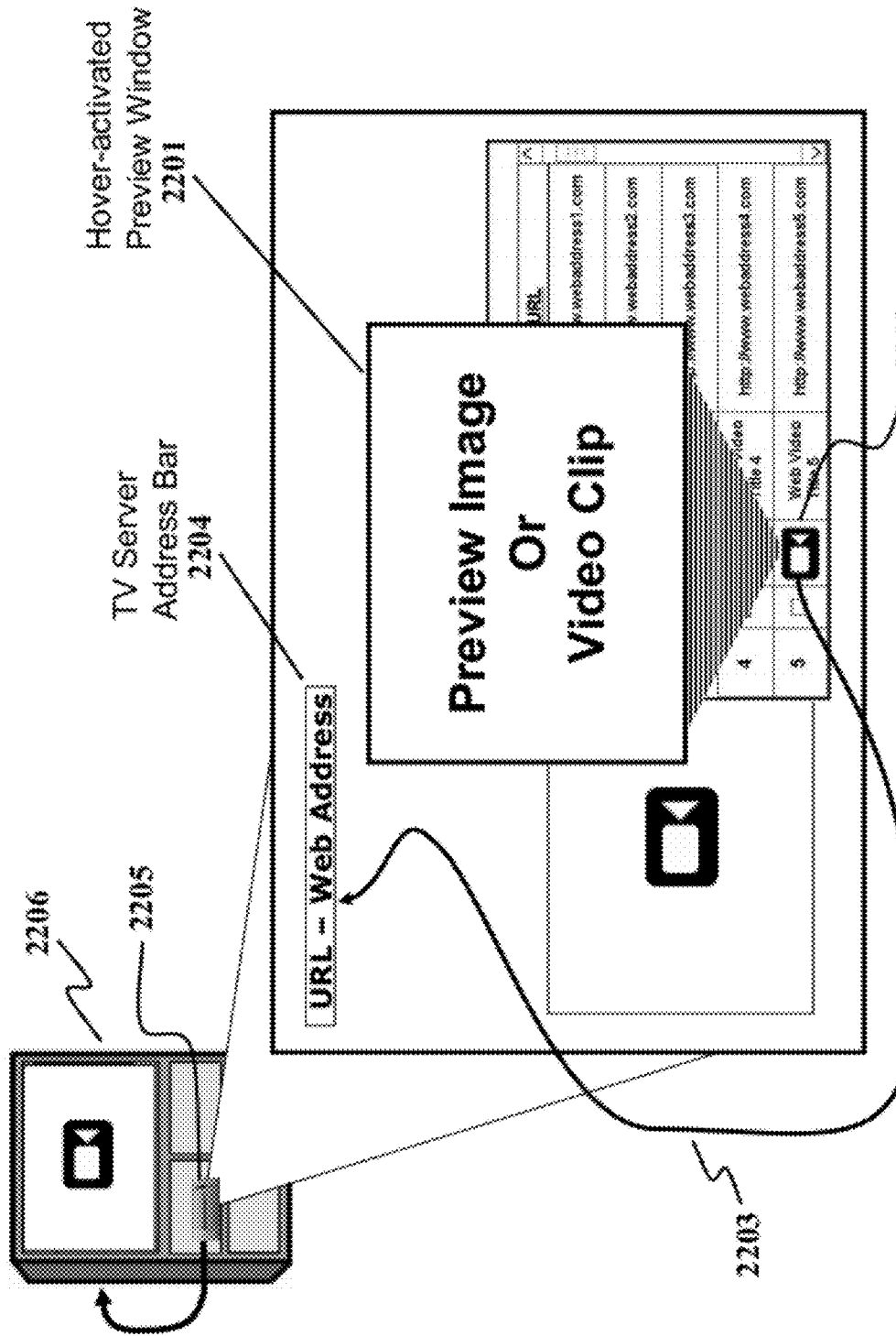
FIG. 22 shows a pop-up preview window that displays an active video when the user places (hovers) the cursor over a media link or playlist entry.

However, it is not known to make this thumbnail image an active video that plays an excerpt from the referenced media. According to this invention a playlist function on a TV server may include a hover-activated preview window 2201 as shown in FIG. 22 wherein that preview window displays an active video when the user places (hovers) the cursor over a link or playlist entry 2202. Should the user actually click the mouse button while hovering over the link or playlist entry, the system will take the URL for the link or playlist entry, and insert this 2203 at the TV server address bar 2204 causing the media located at that URL to be played on the TV server 2205 and subsequently displayed on TV 2206.

The active video may be either a short excerpt from the referenced video or alternately it may stream a reduced size version of the referenced video such that the streaming video preview will play as long as the user desires—basically as long as the user hovers the mouse over the selected media link. In order to improve the response time for a preview to play when the cursor hovers over a particular media link, it may be useful to pre-store the video information on the PC or TV server where the playlist will be visible the user. Since downloading video information in order to pre-store a preview can be time-consuming, this operation of downloading preview information can be performed as a background operation that happens over time after a media link is added to the playlist.

When a LAN TV server is remotely controlled by a local PC, it may be desirable for either previews of the selected media, or the media itself, to display simultaneously on the LAN TV server and on the local PC. This can be accomplished by utilizing a multicast methodology where the same stream of information is sent to both the LAN TV server and the local PC at the same time.

Figure 23:
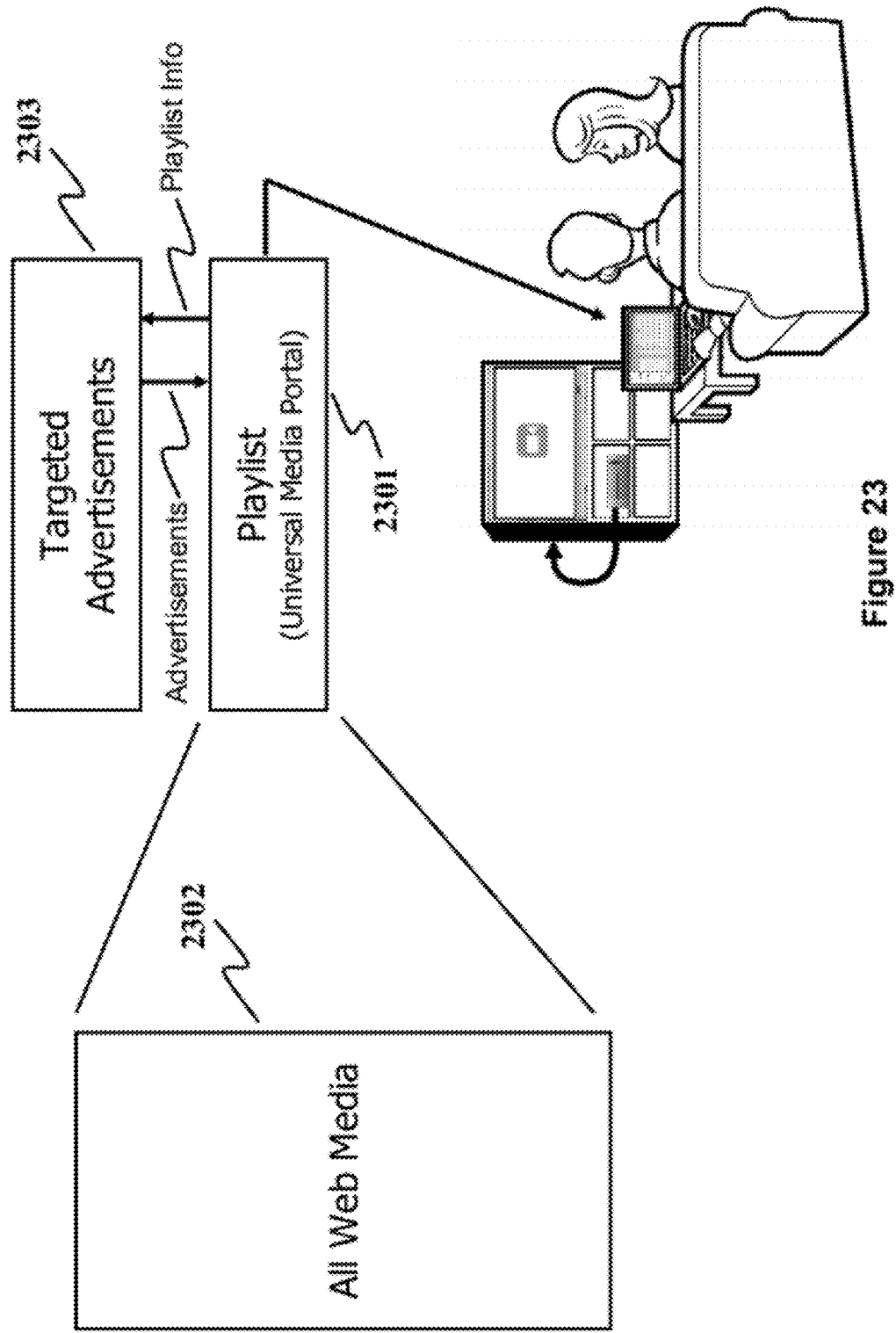
FIG. 23 shows how a playlist being displayed to the user may function as a universal media portal with targeted advertisements displayed with playlist entries.

FIG. 23 shows how the playlist being displayed to the user may function as a universal media portal 2301 providing the user with access to media 2302 from any location on the web, without limiting the user to any particular topic or content source. Thus, the user will tend to compile a playlist having entries that relate in some manner to product and service preferences of the user or the user's family. This offers the opportunity, as shown in FIG. 23, to analyze the media links that the user has compiled and determine appropriate themes for targeted advertising 2303 which may be displayed in the playlist window.

Figure 24:
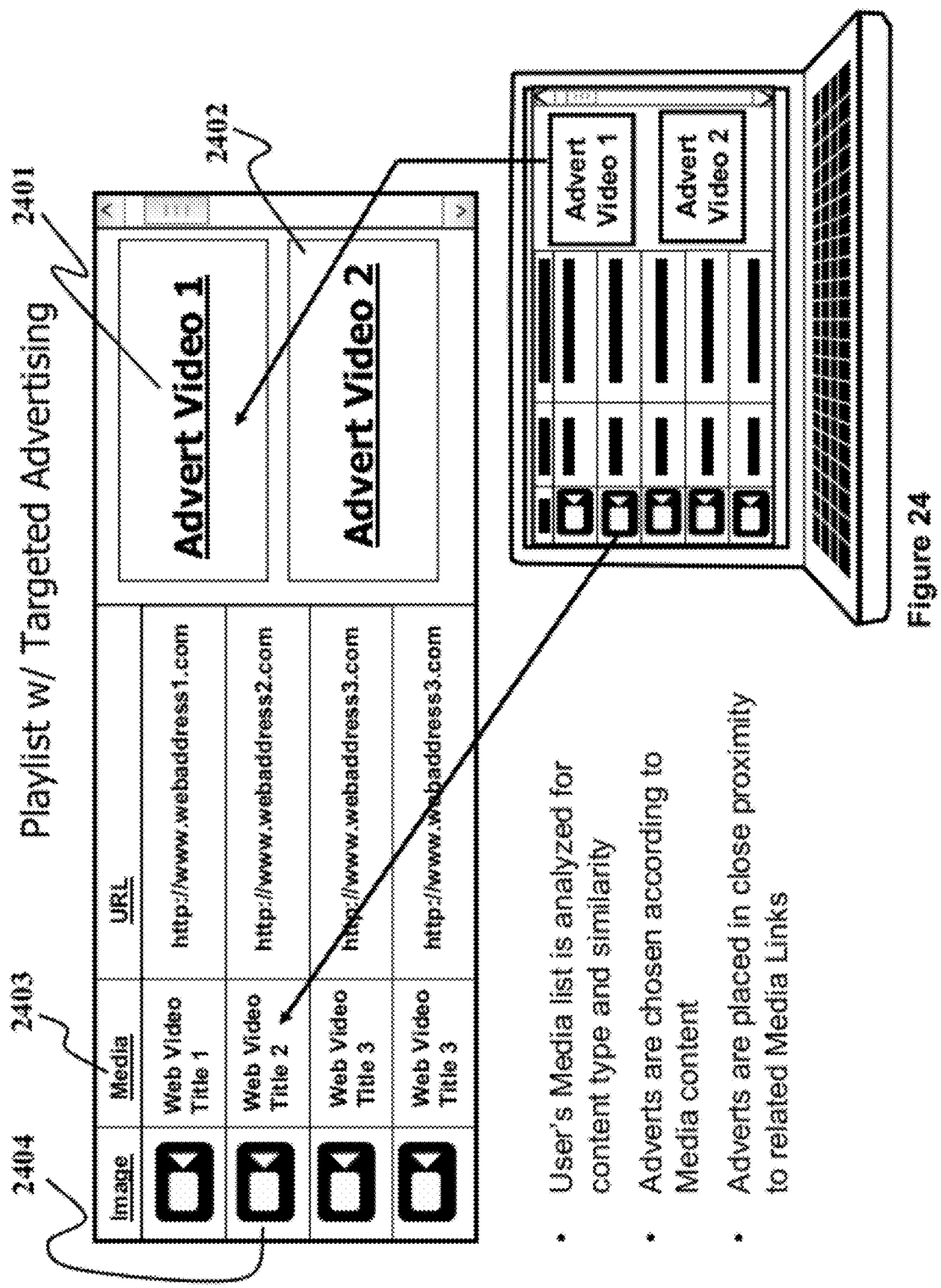
FIG. 24 shows a playlist window display where advertisements comprised of either text, static images, and/or video advertising, are presented to the user adjacent to the list of media links, and a particular ad is placed in close physical proximity to a corresponding playlist entry where an association between the two exists.

FIG. 24 shows a playlist window display where advertisements (2401, 2402), comprised of either text, static images, and/or video advertising, are presented to the user adjacent to the list of media links 2403. A software application within or separate from the playlist function may analyze not only the content referenced by individual links but by neighboring groups of links such that a content targeted advertisement may be presented in a physical location on the screen that is close to the physical position of one or more links to which it has the most relevance. Thus, "Advert Video 1" 2401 located in close physical proximity to playlist entry 2404 entitled "YouTube—Evolution of dance" might display an advertisement for dancing lessons, or alternately might display an advertisement for classic rock 'n roll recordings.

While it is known to offer targeted advertising in a search engine results window such as Google and others, targeted advertising has not been presented in a playlist window where the playlist is used to remotely control a TV server from either a PC or a handheld remote control. Also, targeted advertising in a Google search results window comprises a list of advertisements that relate to a single search criteria. The Google results window does not teach multiple unrelated targeted advertisements which are physically grouped in close proximity to particular related items in the list that is presented, as is disclosed by the present invention.

Content targeted ads may additionally or alternately be targeted according to a viewer's demographic characteristics or their stated or observed preferences. Targeted advertisements may take the form of a video clip that plays when it is visible to the user, or alternately one that plays when the cursor on the controller device hovers over the associated media link.

Sequential Play of Multiple Videos

Figure 25:
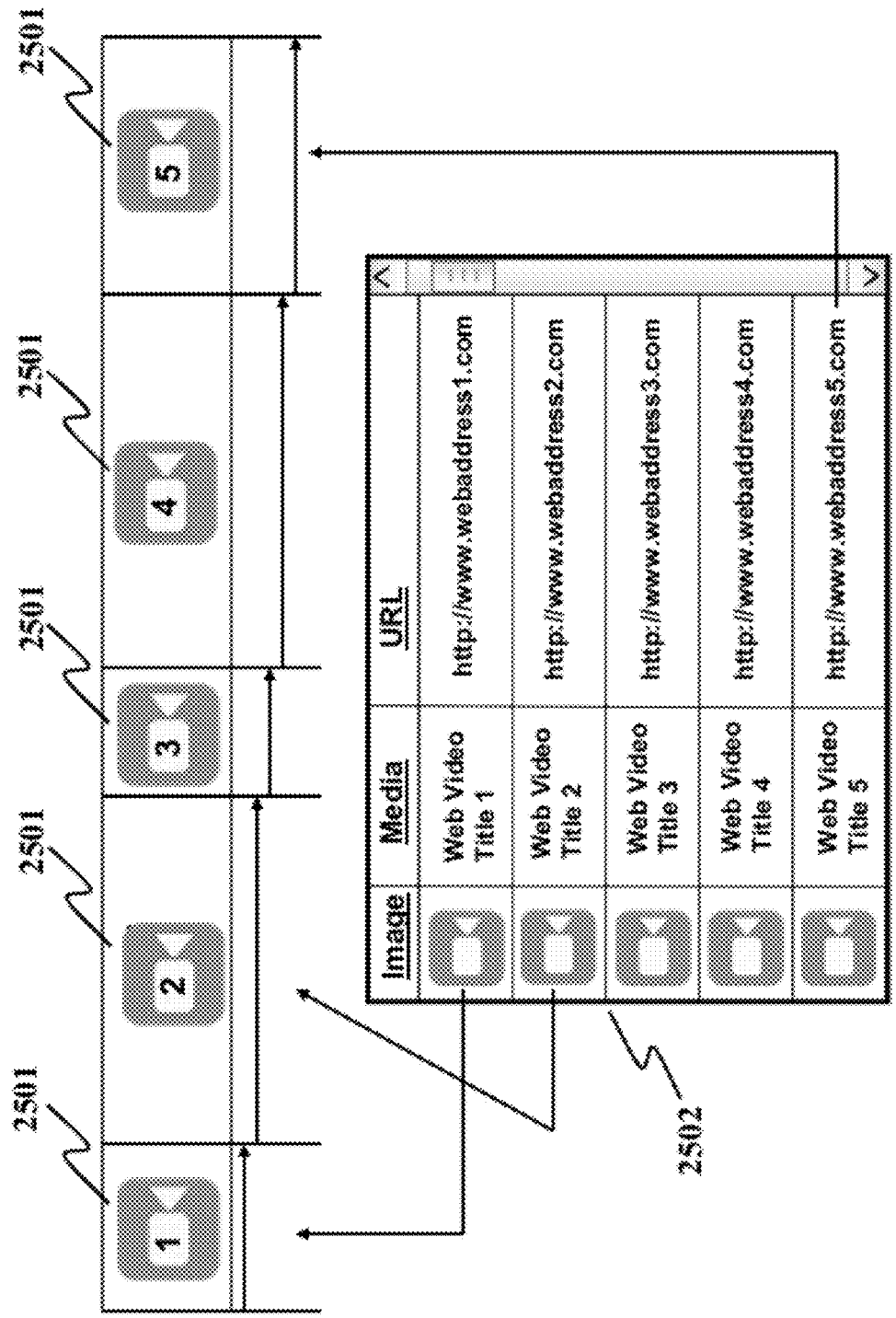
FIG. 25 shows multiple small video clips from a playlist that are automatically concatenated and played in sequence.

Eventually it will become commonplace to stream or download full-length movies from the web to be played on a TV set via a TV server. However, most Web videos are viewed today on PCs, and most of those are short video clips such as those commonly available from YouTube. It is therefore desirable to view multiple small video clips 2501 in sequence as shown in FIG. 25, especially when a group of family or friends views them on a TV set via a TV server. Unfortunately, no media playlist functions available today provide for automatic concatenation of sequential videos in a playlist 2502. This invention includes such a functionality, but for most implementations requires an intimate interaction between the playlist function and the media player software.

Media players are software applications designed to run within the context of an Internet browser. Media player controls can be either integrated in the visual display of the player or be under program control of the running web page. Web media players typically provide limited status feedback to the user. More critical for remote control of web videos is that the capabilities and interfaces of web media players vary.

A Web browser is intended to execute and render the application code and behaviors of a displayed Webpage. Most Web browsers have a mechanism where additional behaviors and controls can be implemented and the application can be modified. Such extensions have the capability to completely change the behavior of the Web browser.

The majority of players have a programmatic mechanism to see what state the player is in—either event signaling or state information is provided. If only player state is provided, then the player state can be polled and the state (e.g., currently playing or stopped) can be assessed. Web pages incorporate various media player control mechanisms ranging from no programmatic control (i.e., only user-activated controls direct to player) to extensive in-page software control (i.e., all user controls heavily managed by application code running in browser). Since browsers incorporate the capacity of being extended, an extension can be created that surveys a web page and identifies if and what kind of media player is incorporated. This extension can also analyze any programmatic control currently being used in the page. A browser extension has the ability of modifying a web page (content and/or program behavior) and this allows for the injection of new behaviors to be implemented based on the web player used and the programmatic control originally implemented. These new behaviors can replace or extend the control behavior originally incorporated in the web page.

Thus, the state of a media player may be monitored either through event signaling or by polling state information, and new behaviors may be injected into the webpage based on the web player used and the programmatic control originally implemented, in order to cause the next sequential video in the playlist to be played automatically when the video currently being played has ended.

The injected behaviors may be extended to include to pre-rolling the next video before the last video finishes. This would allow skipping advertisements included in the video stream. Another behavior that can be implemented for some media players is to automatically fast forward through commercials. Further, if a media sequence (two or more media elements) relies on the same player, they can be bundled in a native player playlist and played in sequence without further control.

Figure 26:
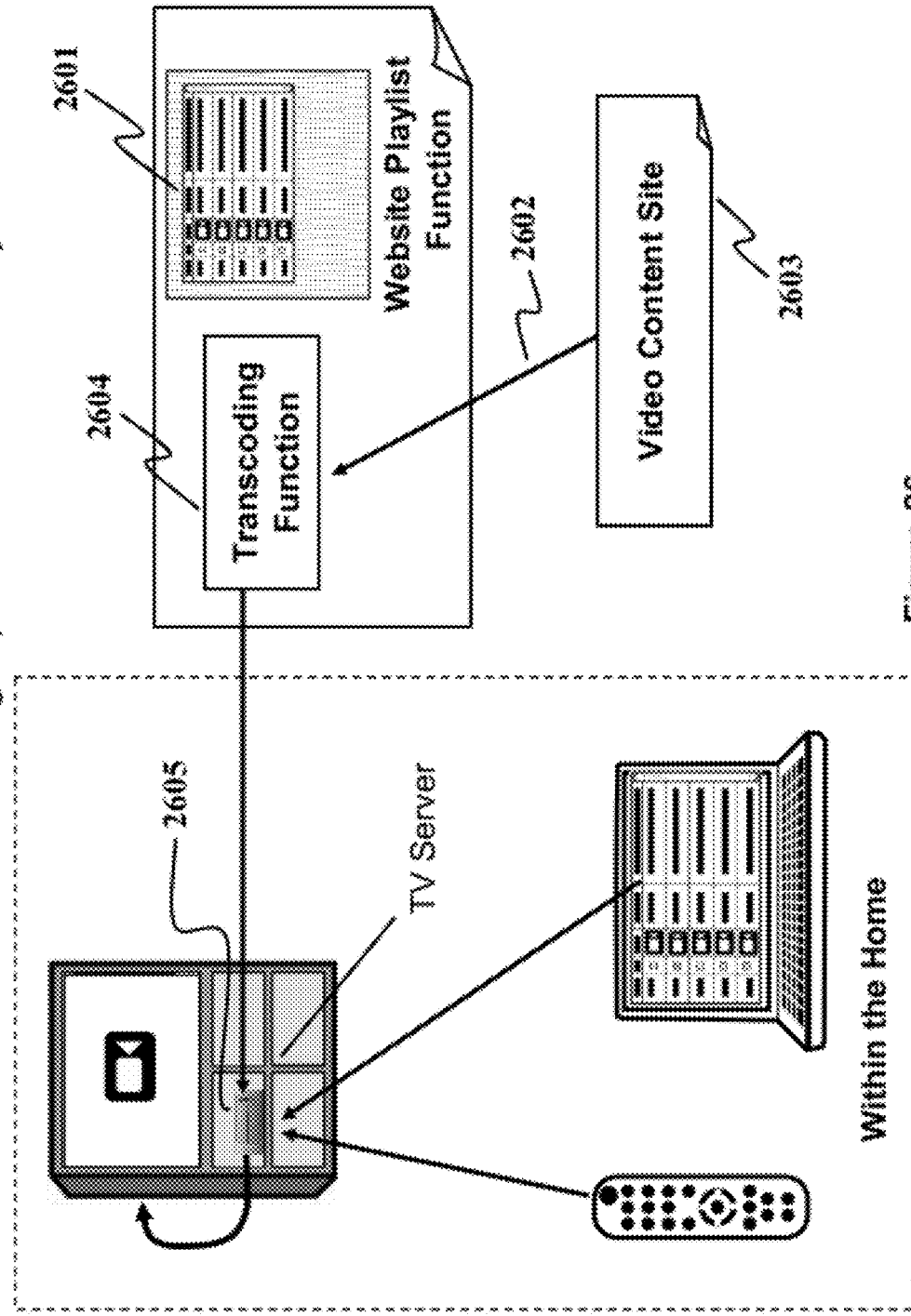
FIG. 26 shows how a video may be automatically passed through a transcoding function on an intermediary Website when the codec required to play a particular video is unavailable on a TV server.

There are times when the media player software/codec required to play a particular video is not available on a particular TV server. This can happen for a variety of reasons including the scenario where the user receives a playlist from a friend, and that playlist was created in an environment where the software media player capabilities were different. When an application program running on the TV server and interfacing with the Web playlist detects that the particular software/codec is not available on the TV server, it could prompt the user that additional software needs to be installed. However, having to install software in order to view a particular video is not always desirable, and a better user experience can be delivered by automatically transcoding the particular video prior to delivery to the TV server. As shown in FIG. 26 the Web playlist function 2601, upon detecting this situation, causes the video stream 2602 coming from the video content site 2603 to be delivered first to Web playlist function 2601. There, it will be offloaded to a transcoding function 2604 which may or may not be executed on a different physical machine than Web playlist function 2601. Transcoding function 2604 will then receive the video stream directly and transcode that video stream on-the-fly, delivering it through the Internet to the user's TV server 2605, without the user having to do any additional software or codec installations.

Thus, methods and functionalities for a media playlist management function including remote control for viewing on a TV server, integrated with a preview function, content-targeted advertising, sequential play, and video transcoding have been described.

What is claimed is:

1. A system for viewing media referenced by playlist entries in a user-compiled playlist including targeted advertisements displayed proximate the playlist, comprising:
   a local remote controller device for controlling a TV server, wherein playlist entries are selected by a user from a playlist displayed on the local remote controller device and not displayed on a TV;
   wherein at least one advertisement is selected from a database of advertisements and wherein said at least one advertisement is closely related to a first playlist entry,
   wherein the at least the one closely related advertisement is displayed on the remote controller device in close physical proximity to the first playlist entry;
   wherein the playlist is compiled by a user; and
   wherein media referenced by a URL media link is added to the playlist by the user according to a method comprising:
   with a cursor over the displayed media link, activating a pop-up menu that includes action choices comprising at least:
      adding the link to the playlist;
      playing the media located at the media link; and
      both of adding the link to the playlist and playing the media located at the media link.

2. The system of claim 1 wherein an initial determination that an advertisement is closely related to the first playlist entry is based on an analysis of media content referenced by the first playlist entry and wherein the playlist does not result from a single search criteria supplied by a user.

3. The system of claim 1 wherein an initial determination that an advertisement is closely related to the first playlist entry is based on an analysis of media content referenced by the first playlist entry, and not based on monitoring user interactions with a program guide supplied by a TV network.

4. The system of claim 1 wherein the advertisement is a video clip, and the advertisement and a preview video referenced by the first playlist entry both play simultaneously.

5. The system of claim 1 wherein content referenced by a group of neighboring playlist entries located in close physical proximity to one another in the playlist is analyzed to determine at least one content targeted advertisement that is closely related to the media content referenced by a plurality of the neighboring playlist entries, and wherein the at least one content targeted advertisement is placed in close proximity to the plurality of the neighboring playlist entries on the display of the remote controller device.

6. The system of claim 1, wherein content targeted advertisements may additionally or alternately be targeted according to a viewer's demographic characteristics.

7. The system of claim 1, wherein content targeted advertisements may additionally or alternately be targeted according to a viewer's stated or observed preferences.

8. The system of claim 1, wherein targeted advertisements take the form of one or more video clips that play when visible to the user.

9. The system of claim 1, wherein targeted advertisements take the form of one or more video clips that play when a cursor on the controller device hovers over the associated playlist entry.

10. A method for viewing media referenced by playlist entries in a media playlist containing targeted advertising wherein the playlist is displayed on a remote controller device and not on a TV, comprising:
   receiving a media playlist compiled by a user that contains playlist entries;
   analyzing content referenced by the media playlist to determine for at least one playlist entry, one or more targeted advertisements from a database of advertisements that are closely related to content referenced by the playlist entry;
   supplying to the remote controller device, the one or more targeted advertisements;
   displaying on the remote controller device and in close physical proximity to the playlist entry, the one or more targeted advertisements; and
   wherein the remote controller device communicates with a TV server connected to the TV; and
   wherein media referenced by a URL media link is added to the playlist by the user according to a method comprising:
   with a cursor over the displayed media link, activating a pop-up menu that includes action choices comprising at least:
      adding the link to the playlist;
      playing the media located at the media link; and
      both of adding the link to the playlist and playing the media located at the media link.

11. The method of claim 10 wherein an initial determination that a targeted advertisement is closely related to the playlist entry is based on an analysis of media content referenced by the playlist entry and wherein the playlist is compiled by a user and not based on a single search criteria supplied by a user.

12. The method of claim 10 wherein an initial determination that a targeted advertisement is closely related to the playlist entry is based on an analysis of media content referenced by the playlist entry and wherein the playlist is compiled by a user, and not based on monitoring user interactions with a program guide supplied by a TV network.

13. The method of claim 10, wherein analyzing content referenced by the media playlist is performed separately from a function implementing the media playlist, and analyzes content referenced by the playlist entry to determine that a targeted advertisement is closely related to the playlist entry.

14. The method of claim 10, wherein analyzing content referenced by the media playlist is performed within a function implementing the media playlist, and wherein content referenced by the playlist entry is analyzed to determine that a targeted advertisement is closely related to the playlist entry.

15. The method of claim 10, wherein content referenced by a neighboring group of playlist entries located in close physical proximity to one another in the playlist is analyzed to determine that at least one targeted advertisement is closely related to the content referenced by a plurality of the neighboring playlist entries, and wherein the at least one targeted advertisement is displayed on the remote controller device in close proximity to the plurality of the neighboring playlist entries.

16. The method of claim 10 wherein the playlist is formed by merging or consolidation of two or more playlists.

17. The method of claim 10, wherein content targeted advertisements may additionally or alternately be targeted according to a viewer's demographic characteristics.

18. The method of claim 10, wherein content targeted advertisements may additionally or alternately be targeted according to a viewer's stated or observed preferences.

19. The method of claim 10, wherein targeted advertisements take the form of one or more video clips that play when visible to the user.

20. The method of claim 10, wherein targeted advertisements take the form of one or more video clips that play when a cursor on the controller device hovers over the associated playlist entry.

* * * * *